(12) United States Patent
Porter et al.

(10) Patent No.: US 8,093,756 B2
(45) Date of Patent: *Jan. 10, 2012

(54) AC POWER SYSTEMS FOR RENEWABLE ELECTRICAL ENERGY

(75) Inventors: Robert M. Porter, Wellington, CO (US); Anatoli Ledenev, Fort Collins, CO (US)

(73) Assignee: AMPT, LLC, Fort Collins, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/682,882

(22) PCT Filed: Apr. 15, 2008

(86) PCT No.: PCT/US2008/060345
§ 371 (c)(1),
(2), (4) Date: Apr. 13, 2010

(87) PCT Pub. No.: WO2009/051854
PCT Pub. Date: Apr. 23, 2009

(65) Prior Publication Data
US 2010/0253150 A1    Oct. 7, 2010

Related U.S. Application Data

(63) Continuation of application No. PCT/US2008/057105, filed on Mar. 14, 2008.

(60) Provisional application No. 60/980,157, filed on Oct. 15, 2007, provisional application No. 60/982,053, filed on Oct. 23, 2007, provisional application No. 60/986,979, filed on Nov. 9, 2007, provisional application No. 60/980,157, filed on Oct. 15, 2007, provisional application No. 60/982,053, filed on Oct. 23, 2007, provisional application No. 60/986,979, filed on Nov. 9, 2007.

(51) Int. Cl.
*H02J 3/00* (2006.01)

(52) U.S. Cl. ............... 307/72; 307/77; 307/82; 307/84; 136/293

(58) Field of Classification Search .................. 136/293; 307/72, 77, 82, 84
See application file for complete search history.

(56) References Cited

U.S. PATENT DOCUMENTS
3,900,943 A    8/1975   Sirti et al.
(Continued)

FOREIGN PATENT DOCUMENTS
EP    0677749 A3    1/1996
(Continued)

OTHER PUBLICATIONS http://www.solarsentry.com; Protecting Your Solar Investment, 2005, Solar Sentry Corp.

(Continued)

*Primary Examiner* — Fritz M Fleming
(74) *Attorney, Agent, or Firm* — Santangelo Law Offices P.C.

(57) ABSTRACT

Renewable electrical energy is provided with aspects and circuitry that can harvest maximum power from an alternative electrical energy source (1) such as a string of solar panels (11) for a power grid (10). Aspects include: i) controlling electrical power creation from photovoltaic DC-AC inverter (5), ii) operating photovoltaic DC-AC inverter (5) at maximal efficiency even when MPP would not be, iii) protecting DC-AC inverter (5) so input can vary over a range of insolation and temperature, and iv) providing dynamically reactive capability to react and assure operation, to permit differing components, to achieve code compliant dynamically reactive photovoltaic power control circuitry (41). With previously explained converters, inverter control circuitry (38) or photovoltaic power converter functionality control circuitry (8) configured as inverter sweet spot converter control circuitry (46) can achieve extraordinary efficiencies with substantially power isomorphic photovoltaic capability at 99.2% efficiency or even only wire transmission losses.

20 Claims, 10 Drawing Sheets

U.S. PATENT DOCUMENTS

| | | |
|---|---|---|
| 4,127,797 A | 11/1978 | Perper |
| 4,168,124 A | 9/1979 | Pizzi |
| 4,218,139 A | 8/1980 | Sheffield |
| 4,222,665 A | 9/1980 | Tacjozawa et al. |
| 4,249,958 A | 2/1981 | Baudin et al. |
| 4,274,044 A | 6/1981 | Barre |
| 4,341,607 A | 7/1982 | Tison |
| 4,375,662 A | 3/1983 | Baker |
| 4,390,940 A | 6/1983 | Corbefin et al. |
| 4,395,675 A | 7/1983 | Toumani |
| 4,404,472 A | 9/1983 | Steigerwald |
| 4,445,030 A | 4/1984 | Carlson |
| 4,445,049 A | 4/1984 | Steigerwald |
| 4,513,167 A | 4/1985 | Brandstetter |
| 4,528,503 A | 7/1985 | Cole |
| 4,580,090 A | 4/1986 | Bailey et al. |
| 4,581,716 A | 4/1986 | Kamiya |
| 4,619,863 A | 10/1986 | Taylor |
| 4,626,983 A | 12/1986 | Harada et al. |
| 4,649,334 A | 3/1987 | Nakajima |
| 4,725,740 A | 2/1988 | Nakata |
| 4,749,982 A | 6/1988 | Rikuna et al. |
| 4,794,909 A | 1/1989 | Elden |
| 4,873,480 A | 10/1989 | Lafferty |
| 4,896,034 A | 1/1990 | Kiriseko |
| 4,899,269 A | 2/1990 | Rouzies |
| 4,922,396 A | 5/1990 | Niggemeyer |
| 5,027,051 A | 6/1991 | Lafferty |
| 5,028,861 A | 7/1991 | Pace et al. |
| 5,179,508 A | 1/1993 | Kernahan et al. |
| 5,270,636 A | 12/1993 | Lafferty |
| 5,401,561 A | 3/1995 | Fisun et al. |
| 5,402,060 A | 3/1995 | Erisman |
| 5,493,155 A | 2/1996 | Okamoto et al. |
| 5,493,204 A | 2/1996 | Caldwell |
| 5,503,260 A | 4/1996 | Riley |
| 5,646,502 A | 7/1997 | Johnson |
| 5,648,731 A | 7/1997 | Decker et al. |
| 5,659,465 A | 8/1997 | Flack et al. |
| 5,669,987 A | 9/1997 | Takehara et al. |
| 5,689,242 A | 11/1997 | Sims et al. |
| 5,741,370 A | 4/1998 | Hanoka |
| 5,747,967 A | 5/1998 | Muljadi et al. |
| 5,782,994 A | 7/1998 | Mori et al. |
| 5,801,519 A | 9/1998 | Midya et al. |
| 5,896,281 A | 4/1999 | Bingley |
| 5,898,585 A | 4/1999 | Sirichote et al. |
| 5,923,100 A | 7/1999 | Lukens et al. |
| 5,932,994 A | 8/1999 | Jo et al. |
| 6,046,401 A | 4/2000 | McCabe |
| 6,081,104 A | 6/2000 | Kern |
| 6,124,769 A | 9/2000 | Igarashi et al. |
| 6,162,986 A | 12/2000 | Shiotsuka |
| 6,180,868 B1 | 1/2001 | Yoshino et al. |
| 6,181,590 B1 | 1/2001 | Yamane et al. |
| 6,191,501 B1 | 2/2001 | Bos |
| 6,218,605 B1 | 4/2001 | Daily et al. |
| 6,218,820 B1 | 4/2001 | D'Arrigo et al. |
| 6,219,623 B1 * | 4/2001 | Wills ............................ 702/60 |
| 6,262,558 B1 | 7/2001 | Weinberg |
| 6,278,052 B1 | 8/2001 | Takehara et al. |
| 6,281,485 B1 | 8/2001 | Siri |
| 6,282,104 B1 | 8/2001 | Kern |
| 6,314,007 B2 | 11/2001 | Johnson, Jr. et al. |
| 6,331,670 B2 | 12/2001 | Takehara et al. |
| 6,351,400 B1 | 2/2002 | Lumsden |
| 6,369,462 B1 | 4/2002 | Siri |
| 6,433,522 B1 | 8/2002 | Siri |
| 6,433,992 B2 | 8/2002 | Nakagawa et al. |
| 6,441,896 B1 | 8/2002 | Field |
| 6,448,489 B2 | 9/2002 | Kimura et al. |
| 6,493,246 B2 | 12/2002 | Suzui et al. |
| 6,515,215 B1 | 2/2003 | Mimura |
| 6,545,211 B1 | 4/2003 | Mimura |
| 6,545,868 B1 | 4/2003 | Kledzik et al. |
| 6,593,521 B2 | 7/2003 | Kobayashi |
| 6,624,350 B2 | 9/2003 | Nixon et al. |
| 6,670,721 B2 | 12/2003 | Lof et al. |
| 6,686,533 B2 | 2/2004 | Raum et al. |
| 6,686,727 B2 | 2/2004 | Ledenev et al. |
| 6,750,391 B2 | 6/2004 | Bower et al. |
| 6,791,024 B2 | 9/2004 | Toyomura |
| 6,804,127 B2 | 10/2004 | Zhou |
| 6,889,122 B2 | 5/2005 | Perez |
| 6,914,418 B2 | 7/2005 | Sung |
| 6,920,055 B1 | 7/2005 | Zeng et al. |
| 6,952,355 B2 | 10/2005 | Rissio et al. |
| 6,958,922 B2 | 10/2005 | Kazem |
| 6,984,965 B2 | 1/2006 | Vinciarelli |
| 6,984,970 B2 | 1/2006 | Capel |
| 7,019,988 B2 | 3/2006 | Fung et al. |
| 7,046,531 B2 | 5/2006 | Zocchi et al. |
| 7,068,017 B2 | 6/2006 | Willner et al. |
| 7,072,194 B2 | 7/2006 | Nayar et al. |
| 7,091,707 B2 | 8/2006 | Cutler |
| 7,092,265 B2 | 8/2006 | Kernahan |
| 7,158,395 B2 | 1/2007 | Deng et al. |
| 7,193,872 B2 | 3/2007 | Siri |
| 7,227,278 B2 | 6/2007 | Realmuto et al. |
| 7,248,946 B2 | 7/2007 | Bashaw et al. |
| 7,274,975 B2 | 9/2007 | Miller |
| 7,333,916 B2 | 2/2008 | Warfield et al. |
| 7,365,661 B2 | 4/2008 | Thomas |
| 7,471,073 B2 | 12/2008 | Rettenwort et al. |
| 7,479,774 B2 | 1/2009 | Wai et al. |
| 7,514,900 B2 | 4/2009 | Sander et al. |
| 7,596,008 B2 | 9/2009 | Iwata et al. |
| D602,432 S | 10/2009 | Moussa |
| 7,602,080 B1 | 10/2009 | Hadar et al. |
| 7,605,498 B2 * | 10/2009 | Ledenev et al. ................. 307/80 |
| 7,619,200 B1 | 11/2009 | Seymour et al. |
| 7,663,342 B2 | 2/2010 | Kimball et al. |
| 7,719,140 B2 * | 5/2010 | Ledenev et al. ................. 307/80 |
| 7,768,155 B2 | 8/2010 | Fornage |
| 7,786,716 B2 | 8/2010 | Simburger et al. |
| 7,807,919 B2 | 10/2010 | Powell |
| 7,834,580 B2 | 11/2010 | Haines |
| 7,919,953 B2 | 4/2011 | Porter et al. |
| 7,962,249 B1 * | 6/2011 | Zhang et al. .................... 307/82 |
| 2001/0007522 A1 | 7/2001 | Nakagawa et al. |
| 2001/0032664 A1 | 10/2001 | Takehara et al. |
| 2003/0062078 A1 | 4/2003 | Mimura |
| 2003/0075211 A1 | 4/2003 | Makita et al. |
| 2003/0117822 A1 * | 6/2003 | Stamenic et al. ............. 363/132 |
| 2004/0095020 A1 | 5/2004 | Kernahan et al. |
| 2004/0100149 A1 | 5/2004 | Lai |
| 2004/0135560 A1 | 7/2004 | Kernahan et al. |
| 2004/0159102 A1 * | 8/2004 | Toyomura et al. ........... 60/641.8 |
| 2004/0164557 A1 | 8/2004 | West |
| 2004/0207366 A1 | 10/2004 | Sung |
| 2004/0211456 A1 | 10/2004 | Brown et al. |
| 2005/0002214 A1 | 1/2005 | Deng et al. |
| 2005/0068012 A1 | 3/2005 | Cutler |
| 2005/0105224 A1 * | 5/2005 | Nishi .............................. 361/18 |
| 2005/0109386 A1 | 5/2005 | Marshall |
| 2005/0121067 A1 | 6/2005 | Toyomura |
| 2005/0162018 A1 | 7/2005 | Realmuto et al. |
| 2005/0169018 A1 | 8/2005 | Hatai et al. |
| 2005/0254191 A1 | 11/2005 | Bashaw et al. |
| 2006/0017327 A1 | 1/2006 | Siri et al. |
| 2006/0103360 A9 | 5/2006 | Cutler |
| 2006/0162772 A1 | 7/2006 | Preser et al. |
| 2006/0171182 A1 | 8/2006 | Siri et al. |
| 2006/0174939 A1 | 8/2006 | Matan |
| 2007/0024257 A1 | 2/2007 | Boldo |
| 2007/0035975 A1 | 2/2007 | Dickerson et al. |
| 2007/0044837 A1 | 3/2007 | Simburger et al. |
| 2007/0069520 A1 | 3/2007 | Schetters |
| 2007/0111103 A1 | 5/2007 | Konishiike et al. |
| 2007/0119718 A1 | 5/2007 | Gibson et al. |
| 2007/0133241 A1 | 6/2007 | Mumtaz et al. |
| 2007/0159866 A1 | 7/2007 | Siri |
| 2007/0171680 A1 | 7/2007 | Perreault et al. |
| 2007/0236187 A1 | 10/2007 | Wai et al. |
| 2008/0036440 A1 | 2/2008 | Garner |
| 2008/0062724 A1 | 3/2008 | Feng et al. |
| 2008/0097655 A1 | 4/2008 | Hadar et al. |

| | | | | | | |
|---|---|---|---|---|---|---|
| 2008/0101101 | A1 | 5/2008 | Iwata et al. | GB | 2419968 A | 5/2006 |
| 2008/0111517 | A1 | 5/2008 | Pfeifer et al. | GB | 2421847 A | 7/2006 |
| 2008/0123375 | A1 | 5/2008 | Beardsley | GB | 2434490 A | 7/2007 |
| 2008/0136367 | A1 | 6/2008 | Adest et al. | JP | 56042365 A2 | 4/1981 |
| 2008/0143188 | A1 | 6/2008 | Adest et al. | JP | 60027964 A2 | 2/1985 |
| 2008/0144294 | A1 | 6/2008 | Adest et al. | JP | 60148172 A2 | 8/1985 |
| 2008/0147335 | A1 | 6/2008 | Adest et al. | JP | 62154121 A2 | 9/1987 |
| 2008/0150366 | A1 | 6/2008 | Adest et al. | JP | 05003678 A2 | 1/1993 |
| 2008/0164766 | A1 | 7/2008 | Adest et al. | JP | 06035555 A2 | 2/1994 |
| 2008/0186004 | A1 | 8/2008 | Williams | JP | 06141261 A2 | 5/1994 |
| 2008/0238195 | A1 | 10/2008 | Shaver | JP | 07026849 U2 | 1/1995 |
| 2008/0247201 | A1 | 10/2008 | Perol | JP | 07222436 A2 | 8/1995 |
| 2008/0257397 | A1 | 10/2008 | Glaser et al. | JP | 08033347 A2 | 2/1996 |
| 2009/0039852 | A1 | 2/2009 | Fishelov et al. | JP | 08066050 A2 | 3/1996 |
| 2009/0078300 | A1 | 3/2009 | Ang et al. | JP | 08181343 A2 | 7/1996 |
| 2009/0114263 | A1 | 5/2009 | Powell et al. | JP | 08204220 A2 | 8/1996 |
| 2009/0120485 | A1 | 5/2009 | Kikinis | JP | 09097918 A2 | 4/1997 |
| 2009/0133736 | A1 | 5/2009 | Powell et al. | JP | 9148613 A2 | 6/1997 |
| 2009/0140715 | A1 | 6/2009 | Adest et al. | JP | 2000020150 A2 | 1/2000 |
| 2009/0141522 | A1 | 6/2009 | Adest et al. | JP | 20011086765 A | 3/2001 |
| 2009/0145480 | A1 | 6/2009 | Adest et al. | JP | 2002231578 A | 8/2002 |
| 2009/0146505 | A1 | 6/2009 | Powell et al. | JP | 2002231578 A2 | 8/2002 |
| 2009/0146667 | A1 | 6/2009 | Adest et al. | JP | 2007104872 A | 4/2007 |
| 2009/0146671 | A1 | 6/2009 | Gazit | JP | 2007225625 A | 6/2007 |
| 2009/0147554 | A1 | 6/2009 | Adest et al. | JP | 27058845 A | 8/2007 |
| 2009/0150005 | A1 | 6/2009 | Hadar et al. | JP | 2007058843 A | 8/2007 |
| 2009/0160258 | A1 | 6/2009 | Allen et al. | KR | 1020050071689 A | 7/2005 |
| 2009/0206666 | A1 | 8/2009 | Sella et al. | KR | 1020060060825 A | 7/2006 |
| 2009/0218887 | A1 | 9/2009 | Ledenev et al. | KR | 1020070036528 A | 3/2007 |
| 2009/0234692 | A1 | 9/2009 | Powell et al. | KR | 1020080092747 A | 10/2008 |
| 2009/0237042 | A1 | 9/2009 | Glovinski | WO | 90/03680 | 4/1990 |
| 2009/0237043 | A1 | 9/2009 | Glovinsky | WO | 9003680 A1 | 4/1990 |
| 2009/0273241 | A1 | 11/2009 | Gazit et al. | WO | 20020073785 A1 | 9/2002 |
| 2009/0283128 | A1 | 11/2009 | Zhang et al. | WO | 2003036688 A2 | 4/2003 |
| 2009/0283129 | A1 | 11/2009 | Foss | WO | 2004100344 A2 | 11/2004 |
| 2009/0284078 | A1 | 11/2009 | Zhang et al. | WO | 2004100348 A1 | 11/2004 |
| 2009/0284232 | A1 | 11/2009 | Zhang et al. | WO | WO 2004107543 A2 * | 12/2004 |
| 2009/0284240 | A1 | 11/2009 | Zhang et al. | WO | 2005027300 A1 | 3/2005 |
| 2009/0284998 | A1 | 11/2009 | Zhang et al. | WO | 2005036725 A1 | 4/2005 |
| 2010/0026097 | A1 | 2/2010 | Avrutsky et al. | WO | WO 2005076445 A1 * | 8/2005 |
| 2010/0027297 | A1 | 2/2010 | Avrutsky et al. | WO | 2006005125 A1 | 1/2006 |
| 2010/0117858 | A1 | 5/2010 | Rozenboim | WO | WO 2006005125 A1 * | 1/2006 |
| 2010/0118985 | A1 | 5/2010 | Rozenboim | WO | 2006013600 A2 | 2/2006 |
| 2010/0127570 | A1 | 5/2010 | Hadar et al. | WO | 2006013600 A3 | 2/2006 |
| 2010/0127571 | A1 | 5/2010 | Hadar et al. | WO | 2006048688 A1 | 5/2006 |
| 2010/0132758 | A1 | 6/2010 | Gilmore | WO | 2006048689 A2 | 5/2006 |
| 2010/0139732 | A1 | 6/2010 | Hadar et al. | WO | 2006048689 A3 | 5/2006 |
| 2010/0139734 | A1 | 6/2010 | Hadar et al. | WO | 2006071436 A2 | 7/2006 |
| 2010/0139743 | A1 | 6/2010 | Hadar et al. | WO | 2006078685 A2 | 7/2006 |
| 2010/0001587 | A1 | 7/2010 | Casey et al. | WO | 2006090675 | 8/2006 |
| 2010/0195361 | A1 | 8/2010 | Stem | WO | 2006117551 A2 | 11/2006 |
| 2010/0229915 | A1 | 9/2010 | Ledenev et al. | WO | 2006137948 A2 | 12/2006 |
| 2010/0246230 | A1 | 9/2010 | Porter et al. | WO | 2007007360 A2 | 1/2007 |
| 2010/0253150 | A1 | 10/2010 | Ledenev et al. | WO | 200708429 A2 | 7/2007 |
| 2010/0308662 | A1 | 12/2010 | Schatz et al. | WO | 2007080429 A2 | 7/2007 |
| 2011/0067745 | A1 | 3/2011 | Ledenev et al. | WO | 2007142693 A3 | 12/2007 |
| 2011/0095613 | A1* | 4/2011 | Huang et al. ............ 307/77 | WO | 2008125915 A2 | 10/2008 |
| 2011/0115300 | A1* | 5/2011 | Chiang et al. ............ 307/82 | WO | 2008125915 A3 | 10/2008 |
| 2011/0127841 | A1* | 6/2011 | Chiang et al. ............ 307/82 | WO | 2008132551 A2 | 11/2008 |
| 2011/0160930 | A1* | 6/2011 | Batten et al. ............ 307/82 | WO | 2008132551 A3 | 11/2008 |
| 2011/0175454 | A1* | 7/2011 | Williams et al. ............ 307/82 | WO | 2008132553 A2 | 11/2008 |
| 2011/0193515 | A1* | 8/2011 | Wu et al. ............ 307/82 | WO | 2008142480 A2 | 11/2008 |
| | | | | WO | 2008142480 A3 | 11/2008 |
| | | | | WO | 2008142480 A4 | 11/2008 |
| FOREIGN PATENT DOCUMENTS | | | | WO | 2008069926 A3 | 12/2008 |
| EP | 0677749 A2 | | 10/1996 | WO | 2009007782 A2 | 1/2009 |
| EP | 0824273 A2 | | 2/1998 | WO | 2009007782 A3 | 1/2009 |
| EP | 0964415 A1 | | 12/1999 | WO | 2009007782 A4 | 1/2009 |
| EP | 0964457 A2 | | 12/1999 | WO | 2009051853 A1 | 4/2009 |
| EP | 0964457 A3 | | 12/1999 | WO | 2009051854 A1 | 4/2009 |
| EP | 00978884 A3 | | 3/2000 | WO | 2009051870 A1 | 4/2009 |
| EP | 0780750 B1 | | 3/2002 | WO | 2009055474 A1 | 4/2009 |
| EP | 1120895 A3 | | 5/2004 | WO | 2009059028 A2 | 5/2009 |
| FR | 612859 | | 11/1948 | WO | 2009059028 A3 | 5/2009 |
| GB | 310362 | | 9/1929 | WO | 2009064683 A2 | 5/2009 |
| GB | 612859 | | 11/1948 | WO | 2009064683 A3 | 5/2009 |
| GB | 1231961 | | 9/1969 | WO | 2009072075 A2 | 6/2009 |
| GB | 5050197 A | | 11/2005 | WO | 2009072075 A3 | 6/2009 |
| GB | 2415841 A | | 1/2006 | WO | 2009072075 A9 | 6/2009 |
| GB | 2415841 B | | 1/2006 | | | |

| WO | 2009072076 A2 | 6/2009 |
| WO | 2009072076 A3 | 6/2009 |
| WO | 2009072077 A1 | 6/2009 |
| WO | 2009073867 A1 | 6/2009 |
| WO | 2009073868 A1 | 6/2009 |
| WO | 2009075985 A2 | 6/2009 |
| WO | 2009075985 A3 | 6/2009 |
| WO | 2009114341 A2 | 9/2009 |
| WO | 2009114341 A3 | 9/2009 |
| WO | 2009118682 A2 | 10/2009 |
| WO | 2009118682 A3 | 10/2009 |
| WO | 2009118682 A4 | 10/2009 |
| WO | 2009118683 A2 | 10/2009 |
| WO | 2009118683 A3 | 10/2009 |
| WO | 2009118683 A4 | 10/2009 |
| WO | 2009136358 A1 | 11/2009 |
| WO | 2009136358 A4 | 11/2009 |
| WO | 2009140536 A2 | 11/2009 |
| WO | 2009140536 A3 | 11/2009 |
| WO | 2009140539 A2 | 11/2009 |
| WO | 2009140539 A3 | 11/2009 |
| WO | 2009140543 A2 | 11/2009 |
| WO | 2009140543 A3 | 11/2009 |
| WO | 2009140551 A2 | 11/2009 |
| WO | 2009140551 A3 | 11/2009 |
| WO | 2010014116 A1 | 2/2010 |
| WO | 2010062410 A1 | 6/2010 |
| WO | 2010062662 A2 | 6/2010 |
| WO | 2010062662 A3 | 6/2010 |
| WO | 2010065043 A1 | 6/2010 |
| WO | 2010002960 A1 | 7/2010 |
| WO | 2010120315 A1 | 10/2010 |
| WO | 2011049985 A1 | 4/2011 |

OTHER PUBLICATIONS

Bower, et al. "Innovative PV Micro-Inverter Topology Eliminates Electrolytic Capacitors for Longer Lifetime," 1-4244-0016-3-06 IEEE p. 2038.

"Solar Sentry's Competitive Advantage," 1 page with table summarizing Solar Sentry's sustainable competitive advantage over two primary alternative approaches.

Dallas Semiconductor; Battery I.D. chip from Dallas Semiconductor monitors and reports battery pack temperature, Bnet World Network, Jul. 10, 1995.

deHaan, S.W.H., et al; Test results of a 130W AC module, a modular solar AC power station, Photovoltaic Energy Conversion, 1994; Conference Record of the 24th IEEE Photovoltaic Specialists Conference Dec. 5-9, 1994; 1994 IEEE First World Conference, vol. 1, pp. 925-928.

European patent application No. 1999111425 filed Nov. 6, 1999; and various office actions.

Gomez, M; "Consulting in the solar power age," IEEE-CNSV: Consultants' Network of Silicon Valley, Nov. 13, 2007.

Guo, G.Z.; "Design of a 400W, 1 Omega, Buck-boost Inverter for PV Applications," 32nd Annual Canadian Solar Energy Conference, Jun. 10, 2007.

Wang, Ucilia; Greentechmedia; "National semi casts solarmagic;" www.greentechmedia.com; Jul. 2, 2008.

Kroposki, H. Thomas and Witt, B & C; "Progress in Photovoltaic Components and Systems," National Renewable Energy Laboratory, May 200; NREL-CP-520-27460.

Hashimoto et al; "A Novel High Performance Utility Interactive Photovoltaic Inverter System," Department of Electrical Engineering, Tokyo Metropolitan University, 1-1 Miinami-Osawa, Hachioji, Tokyo, 192-0397, Japan; p. 2255.

Hua, C et al; "Control of DC-DC Converters for Solar energy System with Maximum Power Tracking," Department of Electrical Engineering; National Yumin University of Science & Technology, Taiwan; vol. 2, Nov. 9-14, 1997; pp. 827-832.

Kern, G; "SunSine (TM)300: Manufacture of an AC Photovoltaic Module," Final Report, Phases I & II, Jul. 25, 1995-Jun. 30, 1998; National Renewable Energy Laboratory, Mar. 1999; NREL-SR-520-26085.

Kang, F et al; Photovoltaic Power Interface Circuit Incorporated with a Buck-boost Converter and a Full-bridge Inverter;' doi:10.1016-j.apenergy2004.10.009.

Kretschmar, K et al; "An AC Converter with a Small DC Link Capacitor for a 15kW Permanent Magnet Synchronous Integral Motor,Power Electronics and Variable Speed Drive," 1998;7th International Conference; Conf. Publ. No. 456; Sep. 21-23, 1998; pp. 622-625.

Lim, Y.H. et al; "Simple Maximum Power Point Tracker for Photovoltaic Arrays," Electronics Letters May 25, 2000; vol. 36, No. 11.

Linear Technology Specification Sheet, LTM4607.

Matsuo, H et al; Novel Solar Cell Power Supply System using the Multiple-input DC-DC Converter;' Telecommunications Energy Conference, 1998; INTELEC, 20th International, pp. 797-8022.

solar-electric.com; Northern Arizona Wind & Sun, All About MPPT Solar Charge Controllers; Nov. 5, 2007.

Oldenkamp, H. et al; AC Modules: Past, Present and Future, Workshop Installing the Solar Solution; pp. 22-23; Jan. 1998; Hatfield, UK.

Presher, Gordon E. Jr. (first named inventor); Portion of File Wrapper, Information Disclosure Statement by Applicant.

Rodriguez, C; "Analytic Solution to the Photovoltaic Maximum Power Point Problem;" IEEE Transactions of Power Electronics, vol. 54, No. 9, Sep. 2007.

DeDoncker, Rik; "Power Converter for PV-Systems," Institute for Power Electrical Drives, RWTH Aachen Univ.

Roman, E et al; "Intelligent PV Module for Grid-Connected PV Systems;" IEEE Transactions of Power Electronics, vol. 53, No. 4, Aug. 2006.

Russell, M.C. et al; "The Massachusetts Electric Solar Project: A Pilot Project to Commercialize Residential PC Systems," Photovoltaic Specialists Conference 2000; Conference Record of the 28th IEEE; pp. 1583-1586.

SatCon Power Systems, PowerGate Photovoltaic 50kW Power Converter System; Spec Sheet; Jun. 2004.

Schekulin, Dirk et al; "Module-integratable Inverters in the Power-Range of 100-400 Watts," 13th European Photovoltaic Solar Energy Conference, Oct. 23-27, 1995; Nice, France; p. 1893-1896.

Shimizu, et al; "Generation Control Circuit for Photovoltaic Modules," IEEE Transactions on Power Electronics; vol. 16, No. 3, May 2001.

Takahashi, I. et al; "Development of a Long-life Three-phase Flywheel UPS Using an Electrolytic Capacitorless Converter-inverter," 1999 Scripta Technica, Electr. Eng. Jpn, 127(3); 25-32.

Walker, G.R. et al; "Cascaded DC-DC Converter Connection of Photovoltaic Modules," IEEE Transactions of Power Electronics, vol. 19, No. 4, Jul. 2004.

Walker, G.R. et al; "PV String Per-Module Power Point Enabling Converters," School of Information Technology and Electrical Engineering; The University of Queensland, presented at the Australasian Universities Power Engineering Conference, Sep. 28-Oct. 1, 2003 in Christchurch; AUPEC2003.

Cambridge Consultants—Brochure—Interface 43.

U.S. Appl. No. 60/980,157 filed Oct. 15, 2007.
U.S. Appl. No. 60/982,053 filed Oct. 23, 2007.
U.S. Appl. No. 60/986,979 filed Oct. 15, 2007.
U.S. Appl. No. 60/868,851 filed Dec. 6, 2006.
U.S. Appl. No. 60/868,893 filed Dec. 6, 2006.
U.S. Appl. No. 60/868,962 filed Dec. 7, 2006.
U.S. Appl. No. 60/908,095 filed Mar. 26, 2007.
U.S. Appl. No. 60/916,815 filed May 9, 2007.

Edelmoser, Karl H. and Himmelstoss, Felix A; High Efficiency DC-to-AC Power Inverter with Special DC Interface; Automatika 46 (2005) 3-4, 143-148, Professional Paper, ISSN 0005-1144.

Esmaili, Gholamreza; Application of Advanced Power Electronics in Renewable Energy Sources and Hygrid Generating Systems, Ohio State University, Graduate Program in Electrical and Computer Engineering, 2006, Dissertation.

Dooyong, Jung; "Soft Switching Boost Converter for Photovoltaic Power Generation System;" http://www.conftool.com/epe-pemc2008/index.php?p.=browseSessions&form_session=26&presentations=show&metadata=show, abstract.

Joo, Hyuk Lee; "Soft Switching Multi-Phase Boost Converter for Photovoltaic System," http://www.conftool.com/epe-pemc2008/index.php?page=browseSessions&form_session=26 &presentations=show&metadata=show, abstract.

Kuo, J.-L.; "Duty-based Control of Maximum Power Point Regulation for Power Converter in Solar Fan System with Battery Storage," http:www.actapress.com/PaperInfo.aspx?PaperID=30260&reason=500, abstract.

Enslin, J.H.R.; "Integrated Photovoltaic Maximum Power Point Tracking Converter;" Industrial Electronics, IEEE Transactions on vol. 44, Issue 6, Dec. 1997, pp. 769-773; http://ieeexplore.ieee.org/Xplore/login.jsp?url=/ ie13/41/14174/00649937.pdf?temp=x.

Dehbonei, Hooman; Corp author(s): Curtin University of Technology, School of Electrical and Computer Engineering; 2003; Description: xxi, 284 leaves; ill.; 31 cm. Dissertation: Thesis. Abstract.

Duncan, Joseph, 1981, Corp Author(s): Massachussetts Institute of Technology, Dept. of Electrical Engineering and Computer Science; 2005, Description: 80p.: ill.; 29 cm. Dissertation: Thesis (M. Eng.). Abstract.

Enrique, J.M.; Duran, E; Sidrach-de-Cadona, M; Andujar, JM; "Theoretical Assessment of the Maximum Power Point Tracking Efficiency of Photovoltaic Facilities with Different Converter Topologies;" Source: Solar Energy 81, No. 1 (2007); 31 (8 pages). Association for Applied Solar Energy, Alt. Journal; Uniform Title: Solar energy (Photnix, AZ); Key Title: Solar energy; Preceding Title: Journal of solar energy, science and engineering; Standard No: ISSN: 0038-092X CODEN: SRENA4. No abstract available.

Chung, H.S.H.; Hui Tse, K.K.; "A Novel Maximum Power Point Tracking Technique for PV Panels;" Dept. of Electronic Engineering, City Univerisity of Hong Kong; Source: PESC Record—IEEE Annual Power Electronics Specialists Conference, v 4, 2001, p. 1970-1975, Jun. 17-21, 2001; Abstract.

Mutoh, Nobuyoshi; A Photovoltaic Generation System Acquiring Efficiently the Electrical Energy Generated with Solar Rays,; Graduate School of Tokyo, Metropolitan Institute of Technology; Source: Series on Energy and Power Systems, Proceedings of the Fourth IASTED International Conference on Power and Energy Systems, Jun. 28-30, 2004; p. 97-103. Abstract.

Rajan, Anita; "Maximum Power Point Tracker Optimized for Solar Powered Cars;" Society of Automotive Engineers, Transactions, v 99, n Sect 6, 1990, p. 1408-1420; Abstract.

Mutoh, Nobuyoshi, "A Controlling Method for Charging Photovoltaic Generation Power Obtained by a MPPT Control Method to Series Connected Ultra-electric Double Layer Capacitors;" Intelligent Systems Department, Faculty of Engineering, Graduate School of Tokyo; 39th IAS Annual Meeting (IEEE Industry Applications Society); v 4, 2004, p. 2264-2271. Abstract.

Ho, Billy M.T.; "An Integrated Inverter with Maximum Power Tracking for Grid-Connected PV Systems;" Department of Electronic Engineering, City University of Hong Kong; Conference Proceedings, 19th Annual IEEE Applied Power Electronics Conference and Exposition, Feb. 22-26, 2004; p. 1559-1565. Abstract.

Esram, T., Chapman, P.L., "Comparison of Photovoltaic Array Maximum Power Point Tracking Techniques," Energy Conversion, IEEE Transactions, vo. 22, No. 2, pp. 439-449, Jun. 2007.

Nishida, Yasuyuki, "A Novel Type of Utility-interactive Inverter for Photovoltaic System," Conference Proceedings, IPEMC 2004; 4th International Power and Electronics Conference, Aug. 14-16, 2004; Xian Jiaotong University Press, Xian, China; p. 1785-1790. Abstract. Anon Source; International Symposium on Signals, Circuits and Systems, Jul. 12-13, 2007; Iasi, Romania; Publisher: Institute of Electrical and Electroncis Engineers Computer Society; Abstract.

Case, M.J.; "Minimum Component Photovoltaic Array Maximum Power Point Tracker," Vector (Electrical Engineering), Jun. 1999; p. 4-8; Abstract.

Daher, Sergio; "Analysis, Design and Implementation of a High Efficiency Multilevel Converter for Renewable Energy Systems," Kassel University Press, ISBN: 978-3-89958-236-9, 2006, 147 pages. Abstract.

Xue, John, "PV Module Series String Balancing Converters," Supervised by Geoffrey Walker, Nov. 6, 2002; University of Queensland, School of Information Technology and Electrical Engineering.

Siri, K; "Study of System Instability in Current-mode Converter Power Systems Operating in Solar Array Voltage Regulation Mode," Dept. of Electrical and Electronic Systems, Aerospace Corp., El Segundo, CA; Feb. 6-10, 2000 in New Orleans, LA, 15th Annual IEEE Applied Power Electronics Conference and Exposition, pp. 228-234.

Reimann, T, Szeponik, S; Berger, G; Petzoldt, J; "A Novel Control Principle of Bi-directional DC-DC Power Conversion," 28th Annual IEEE Power Electroncis Specialists Conference, St. Louis, MO Jun. 22-27, 1997; vol. 2 pp. 978-984. Abstract.

Kaiwei, Yao, Mao, Ye; Ming, Xu; Lee, F.C.; "Tapped-inductor Buck Converter for High-step-down DC-DC Conversion," IEEE Transactions on Power Electronics, vol. 20, Issue 4, Jul. 2005; pp. 775-780; Abstract.

Ertl, H; Kolar, J.W.; Zach, F.C.; "A Novel Multicell DC-AC Converter for Applications in Renewable Energy Systems;" IEEE Transactions on Industrial Electronics, Oct. 2002; vol. 49, Issue 5, pp. 1048-1057; Abstract.

Bascope, G.V.T.; Barbi, I; "Generation of a Family of Non-isolated DC-DC PWM Converters Using New Three-state Switching Cells;" 2000 IEEE 31st Annual Power Electronics Specialists Conference in Galway, Ireland; vol. 2, pp. 858-863; Abstract.

Duan, Rouo-Yong; Chang, Chao-Tsung; "A Novel High-efficiency Inverter for Stand-alone and Grid-connected Systems," 2008 3rd IEEE Conference on Industrial Electronics and Applications in Singapore, Jun. 3-5, 2008; Article No. 4582577. Abstract.

Cuadras, A; Ben Amor, N; Kanoun, O; "Smart Interfaces for Low Power Energy Harvesting Systems," 2008 IEEE Instrumentation and Measurement Technology Conference May 12-15, 2008 in Victoria, BC Canada; pp. 78-82 and 12-15. Abstract.

Quan, Li; Wolfs, P; "An Analysis of the ZVS Two-inductor Boost Converter Under Variable Frequency Operation," IEEE Transactions on Power Electronics, Central Queensland University, Rockhamton, Qld, AU; vol. 22, No. 1, Jan. 2007; pp. 120-131. Abstract.

Yuvarajan, S; Dachuan, Yu; Shanguang, Xu; "A Novel Power Converter for Photovoltaic Applications," Journal of Power Sources, Sep. 3, 2004; vol. 135, No. 1-2, pp. 327-331; Abstract.

Power Article, Aerospace Systems Lab, Washington University, St. Louis, MO;.

International Application No. PCT/US08/60345, International Search Report dated Aug. 18, 2008.

International Application No. PCT/US08/60345, Written Opinion dated Aug. 18, 2008.

International Application No. PCT/US08/57105, International Search Report dated Jun. 25, 2008.

International Application No. PCT/US08/57105, Written Opinion dated Jun. 25, 2008.

International Application No. PCT/US08/70506, International Search Report dated Sep. 26, 2008.

International Application No. PCT/US08/70506, Written Opinion dated Sep. 26, 2008.

Chen, J., et al. Buck-Boost PWM Converters Having Two Independently Controlled Switches, IEEE Power Electronics Specialists Conference, Jun. 2001, vol. 2, pp. 736-741.

Walker, G. et al. PhotoVoltaic DC-DC Module Integrated Converter for Novel Cascaded and Bypass Grid Connection Topologies—Design and Optimisation, 37th IEEE Power Electronics Specialists Conference / Jun. 18-22, 2006, Jeju, Korea.

Chen, J., et al. A New Low-Stress Buck-Boost Converter for Universal-Input PFC Applications, IEEE Applied Power Electronics Conference, Feb. 2001.

International Application No. PCT/US08/70506 corrected International Preliminary Report on Patentability, mailed Jun. 25, 2010.

U.S. Appl. No. 61/170,567 filed Jul. 17, 2009, First Named Inventor Jianhui Zhang, entire current file wrapper available on USPTO PAIRS.

U.S. Appl. No. 12/456,777 filed Jun. 23, 2010, First Named Inventor Jianhui Zhang, entire current file wrapper available on USPTO PAIRS.

U.S. Appl. No. 12/456,776 filed Jun. 23, 2010, First Named Inventor Jianhui Zhang, entire current file wrapper available on USPTO PAIRS.

U.S. Appl. No. 12/152,566 filed May 14, 2008, First Named Inventor Jianhui Zhang, entire current file wrapper available on USPTO PAIRS.
U.S. Appl. No. 12/152,491 filed May 14, 2008, First Named Inventor Jianhui Zhang, entire current file wrapper available on USPTO PAIRS.
U.S. Appl. No. 12/152,478 filed May 14, 2008, First Named Inventor Jianhui Zhang, entire current file wrapper available on USPTO PAIRS.
U.S. Appl. No. 61/170,578 filed Apr. 17, 2009, First Named Inventor Jianhui Zhang, entire current file wrapper available on USPTO PAIRS.
U.S. Appl. No. 61/200,601 filed Dec. 2, 2008, First Named Inventor Ron Hadar, entire current file wrapper available on USPTO PAIRS.
U.S. Appl. No. 61/200,279 filed Nov. 26, 2008, First Named Inventor Ron Hadar, entire current file wrapper available on USPTO PAIRS.
U.S. Appl. No. 61/137,741 filed Aug. 1, 2008, First Named Inventor Mordechay Avrutski, entire current file wrapper available on USPTO PAIRS.
U.S. Appl. No. 12/506,929 filed Jul. 21, 2009, First Named Inventor Ron Hadar, entire current file wrapper available on USPTO PAIRS.
U.S. Appl. No. 12/411,317 filed Mar. 25, 2009, First Named Inventor Ron Hadar, entire current file wrapper available on USPTO PAIRS.
U.S. Appl. No. 12/202,110 filed Aug. 29, 2008, First Named Inventor Mordechay Avrutski, entire current file wrapper available on USPTO PAIRS.
U.S. Appl. No. 60/207,296 filed Feb. 10, 2009, First Named Inventor Ron Hadar, entire file wrapper available on USPTO PAIRS.
U.S. Appl. No. 61/039,050 filed Mar. 24, 2008, First Named Inventor Tzachi Glovinski, entire current file wrapper available on USPTO PAIRS.
U.S. Appl. No. 60/992,589 filed Dec. 5, 2007, First Named Inventor Tzachi Glovinski, entire file wrapper available on USPTO PAIRS.
U.S. Appl. No. 60/916,815 filed May 9, 2007, First Named Inventor Meir Adest, entire current file wrapper available on USPTO PAIRS.
U.S. Appl. No. 60/908, 095 filed Mar. 26, 2007, First Named Inventor Meir Adest, entire fcurrent ile wrapper available on USPTO PAIRS.
U.S. Appl. No. 60/868,962 filed Dec. 7, 2006, First Named Inventor Meir Adest, entire current file wrapper available on USPTO PAIRS.
U.S. Appl. No. 60/868,893 filed Dec. 6, 2006, First Named Inventor Meir Adest, entire current file wrapper available on USPTO PAIRS.
U.S. Appl. No. 60/868,851 filed Dec. 6, 2006, First Named Inventor Meir Adest, entire current file wrapper available on USPTO PAIRS.
U.S. Appl. No. 12/411,294 filed Mar. 25, 2009, First Named Inventor Guy Sella, entire current file wrapper available on USPTO PAIRS.
U.S. Appl. No. 12/329,520 filed Dec. 5, 2008, First Named Inventor Meir Adest, entire current file wrapper available on USPTO PAIRS.
U.S. Appl. No. 12/328,742 filed Dec. 4, 2008, First Named Inventor Meir Adest, entire current file wrapper available on USPTO PAIRS.
U.S. Appl. No. 12/314,115 filed Dec. 4, 2008, First Named Inventor Meir Adest, entire current file wrapper available on USPTO PAIRS.
U.S. Appl. No. 12/314,113 filed Dec. 4, 2008, First Named Inventor Meir Adest, entire current file wrapper available on USPTO PAIRS.
U.S. Appl. No. 11/951,562 filed Dec. 6, 2007, First Named Inventor Meir Adest, entire current file wrapper available on USPTO PAIRS.
U.S. Appl. No. 11/951,485 filed Dec. 6, 2007, First Named Inventor Meir Adest, entire current file wrapper available on USPTO PAIRS.
U.S. Appl. No. 11/951,419 filed Dec. 6, 2007, First Named Inventor Meir Adest, entire current file wrapper available on USPTO PAIRS.
U.S. Appl. No. 11/950,307 filed Dec. 4, 2007, First Named Inventor Meir Adest, entire current file wrapper available on USPTO PAIRS.
U.S. Appl. No. 11/950,271 filed Dec. 4, 2007, First Named Inventor Meir Adest, entire current file wrapper available on USPTO PAIRS.
U.S. Appl. No. 11/950,224 filed Dec. 4, 2007, First Named Inventor Meir Adest, entire current file wrapper available on USPTO PAIRS.
Feuermann, D. et al., Reversible low solar heat gain windows for energy savings. The Jacob Blaustein Institute, Israel.
Tse, K.K.et al. "A Novel Maximum Power Point Tracking Technique for PV Panels:" Dept. of Electronic Engineering, City Univerisity of Hong Kong; Source: PESC Record—IEEE Annual Power Electronics Specialists Conference, v 4, 2001, p. 1970-1975, Jun. 17-21, 2001; Abstract.
U.S. Appl. No. 11/875,799 filed Oct. 19, 2007, First Named Inventor Ron Hadar, entire current file wrapper available on USPTO PAIRS.
U.S. Appl. No. 12/253,868 filed Oct. 17, 2008, First Named Inventor Dan Kininis, entire current file wrapper available on USPTO PAIRS.
U.S. Appl. No. 12/254,780 filed Oct. 20, 2008, First Named Inventor Earl G. Powell, entire current file wrapper available on USPTO PAIRS.
U.S. Appl. No. 12/260,720 filed Oct. 29, 2008, First Named Inventor Earl G. Powell, entire current file wrapper available on USPTO PAIRS.
U.S. Appl. No. 12/340,540 filed Dec. 19, 2008, First Named Inventor Mordechay Avrutski, entire current file wrapper available on USPTO PAIRS.
U.S. Appl. No. 12/357,357 filed Jan. 21, 2009, First Named Inventor Earl G. Powell, entire current file wrapper available on USPTO PAIRS.
U.S. Appl. No. 12/366,897 filed Feb. 5, 2009, First Named Inventor Earl G. Powell, entire current file wrapper available on USPTO PAIRS.
U.S. Appl. No. 12/392,042 filed Feb. 24, 2009, First Named Inventor Ron Hadar, entire current file wrapper available on USPTO PAIRS.
U.S. Appl. No. 12/467,117 filed May 15, 2009, First Named Inventor Leonid Rozenboim, entire current file wrapper available on USPTO PAIRS.
U.S. Appl. No. 12/542,632 filed Aug. 17, 2009, First Named Inventor Ron Hadar, entire current file wrapper available on USPTO PAIRS.
U.S. Appl. No. 12/567,169 filed Sep. 25, 2009, First Named Inventor Ron Hadar, entire current file wrapper available on USPTO PAIRS.
U.S. Appl. No. 12/628,977 filed Dec. 1, 2009, First Named Inventor Ron Hadar, entire current file wrapper available on USPTO PAIRS.
U.S. Appl. No. 12/628,997 filed Dec. 1, 2009, First Named Inventor Ron Hadar, entire current file wrapper available on USPTO PAIRS.
U.S. Appl. No. 12/467,116 filed May 15, 2009, First Named Inventor Leonid Rozenboim, entire current file wrapper available on USPTO PAIRS.
U.S. Appl. No. 11/951,419 filed Dec. 4, 2007, First Named Inventor Meir Adest, entire current file wrapper available on USPTO PAIRS.
U.S. Appl. No. 12/435,592 filed May 5, 2009, First Named Inventor Meir Gazit, entire current file wrapper available on USPTO PAIRS.
U.S. Appl. No. 12/409,763 filed Mar. 24, 2009, First Named Inventor Tzachi Glovinsky, entire current file wrapper available on USPTO PAIRS.
U.S. Appl. No. 12/409,604 filed Mar. 24, 2009, First Named Inventor Tzachi Glovinsky, entire current file wrapper available on USPTO PAIRS.
U.S. Appl. No. 12/329,525 filed Dec. 5, 2008, First Named Inventor Meir Adest, entire current file wrapper available on USPTO PAIRS.
U.S. Appl. No. 12/314,114 filed Dec. 4, 2008, First Named Inventor Meir Gzait, entire current file wrapper available on USPTO PAIRS.
U.S. Appl. No. 12/187,335 filed Aug. 6, 2008, First Named Inventor Amir Fishelov, entire current file wrapper available on USPTO PAIRS.
National Semiconductor News Release—National semiconductor's SolarMagic Chipset Makes Solar Panels "Smarter" May 2009.
SM3320 Power Optimizer Specifications; SolarMagic Power Optimizer Apr. 2009.
U.S. Appl. No. 12/338,610 filed Dec. 18, 2008, First Named Inventor James Allen, entire current file wrapper available on USPTO PAIRS.
TwentyNinety.com/en/about-us/, printed Aug. 17, 2010; 3 pages.
Knaupp, W. et al., Operation of A 110 kW PV facade with 100 W AC photovoltaic modules, 25th PVSC; May 13-17, 1996; Washington, D.C.
Schoen.T. J. N., BIPV overview & getting PV into the marketplace in the Netherlands, The 2nd World Solar Electric Buildings Conference: Sydney Mar. 8-10, 2000.
Stern M., et al. Development of a Low-Cost Integrated 20-kW-AC Solar Tracking Subarray for Grid-Connected PV Power System Applications—Final Report, National Renewable Energy Laboratory, Jun. 1998.
Verhoeve, C.W.G., et al., Recent Test Results of AC-Module inverters, Netherlands Energy Research Foundation ECN, 1997.

Román, E., et al. Experimental results of controlled PV module for building integrated PV systems; Science Direct; Solar Energy, vol. 82, Issue 5, May 2008, pp. 471-480.

Linares, L., et al. Improved Energy Capture in Series String Photovoltaics via Smart Distributed Power Electronics; Proceedings APEC 2009: 24th Annual IEEE Applied Power Electronics Conference. Washington, D.C., Feb. 2009.

International Application No. PCT/US09/41044, Search Report dated Jun. 5, 2009.

International Application No. PCT/US09/41044, Written Opinion dated Jun. 5, 2009.

International Application No. PCT/US08/79605, Search Report dated Feb. 3, 2009.

International Application No. PCT/US08/79605, Written Opinion dated Feb. 3, 2009.

International Application No. PCT/US08/80794, Search Report dated Feb. 23, 2009.

International Application No. PCT/US08/80794, Written Opinion dated Feb. 23, 2009.

International Application No. PCT/US08/57105, International Preliminary Report on Patentability, mailed Mar. 12, 2010.

US Nonprovisional Application No. 12/363,709, Accelerated Examination Support Document filed Jan. 30, 2009.

US Nonprovisional Application No. 12/363,709, First Amended Accelerated Examination Support Document filed Jul. 15, 2009.

Parallel U.S. Appl. No. 12/738,068; Examiner's Interview Summary dated Oct. 20, 2010.

Parallel U.S. Appl. No. 12/738,068; Nonfinal Office Action dated Nov. 24, 2010.

Parallel U.S. Appl. No. 12/682,559; Nonfinal Office Action dated Dec. 10, 2010.

International Patent Application No. PCT/US2010/053253. International Search Report and International Written Opinion of the International Searching Authority.

Parallel U.S. Appl. No. 12/682,559; Final Office Action dated Mar. 3, 2011.

Parallel U.S. Appl. No. 12/738,068; Notice of Allowance dated Feb. 24, 2011.

Parallel U.S. Appl. No. 12/955,304; Nonfinal Office Action dated Mar. 8, 2011.

Updates to previously cited U.S. Appl. No. 12/152,566 filed May 14, 2008, First Named Inventor Jianhui Zhang, current file wrapper available on USPTO PAIRS.

Updates to previously cited U.S. Appl. No. 11/875,799 filed Oct. 19, 2007, First Named Inventor Ron Hadar, entire current file wrapper available on USPTO PAIRS.

Updates to previously cited U.S. Appl. No. 12/253,868 filed Oct. 17, 2008, First Named Inventor Dan Kininis, entire current file wrapper available on USPTO PAIRS.

Updates to previously cited U.S. Appl. No. 12/254,780 filed Oct. 20, 2008, First Named Inventor Earl G. Powell, entire current file wrapper available on USPTO PAIRS.

Updates to previously cited U.S. Appl. No. 12/260,720 filed Oct. 29, 2008, First Named Inventor Earl G. Powell, entire current file wrapper available on USPTO PAIRS.

Updates to previously cited U.S. Appl. No. 12/340,540 filed Dec. 19, 2008, First Named Inventor Mordechay Avrutski, entire current file wrapper available on USPTO PAIRS.

Updates to previously cited U.S. Appl. No. 12/357,357 filed Jan. 21, 2009, First Named Inventor Earl G. Powell, entire current file wrapper available on USPTO PAIRS.

Updates to previously cited U.S. Appl. No. A22 filed Feb. 24, 2009, First Named Inventor Ron Hadar, entire current file wrapper available on USPTO PAIRS.

Updates to previously cited U.S. Appl. No. 12/467,117 filed May 15, 2009, First Named Inventor Leonid Rozenboim, entire current file wrapper available on USPTO PAIRS.

Updates to previously cited U.S. Appl.No. 12/542,632 filed Aug. 17, 2009, First Named Inventor Ron Hadar, entire current file wrapper available on USPTO PAIRS.

Updates to previously cited U.S. Appl. No. 12/567,169 filed Sep. 25, 2009, First Named Inventor Ron Hadar, entire current file wrapper available on USPTO PAIRS.

Updates to previously cited U.S. Appl. No. 12/454,244 filed May 14, 2009, First Named Inventor Jianhui Zhang, entire current file wrapper available on USPTO PAIRS.

Updates to previously cited U.S. Appl. No. 12/628,977 filed Dec. 1, 2009, First Named Inventor Ron Hadar, entire current file wrapper available on USPTO PAIRS.

Updates to previously cited U.S. Appl. No. 12/628,997 filed Dec. 1, 2009, First Named Inventor Ron Hadar, entire current file wrapper available on USPTO PAIRS.

Updates to previously cited U.S. Appl. No. 12/202,110 filed Aug. 29, 2008, First Named Inventor Mordechay Avrutski, entire current file wrapper available on USPTO PAIRS.

Updates to previously cited U.S. Appl. No. 12/467,116 filed May 15, 2009, First Named Inventor Leonid Rozenboim, entire current file wrapper available on USPTO PAIRS.

Updates to previously cited U.S. Appl. No. 12/506,929 filed Jul. 21, 2009, First Named Inventor Ron Hadar, entire current file wrapper available on USPTO PAIRS.

Updates to previously cited U.S. Appl. No. 11/950,224 filed Dec. 4, 2007, First Named Inventor Meir Adest, entire current file wrapper available on USPTO PAIRS.

Updates to previously cited U.S. Appl. No. 11/950,271 filed Dec. 4, 2007, First Named Inventor Meir Adest, entire current file wrapper available on USPTO PAIRS.

Updates to previously cited U.S. Appl. No. 11/950,307 filed Dec. 4, 2007, First Named Inventor Meir Adest, entire current file wrapper available on USPTO PAIRS.

Updates to previously cited U.S. Appl. No. 11/951,419 filed Dec. 4, 2007, First Named Inventor Meir Adest, entire current file wrapper available on USPTO PAIRS.

Updates to previously cited U.S. Appl. No. 11/951,485 filed Dec. 6, 2007, First Named Inventor Meir Adest, entire current file wrapper available on USPTO PAIRS.

Updates to previously cited U.S. Appl. No. 12/411,294 filed Mar. 25, 2009, First Named Inventor Guy Sella, entire current file wrapper available on USPTO PAIRS.

Updates to previously cited U.S. Appl. No. 12/435,549 filed May 5, 2009, First Named Inventor Meir Gazit, entire current file wrapper available on USPTO PAIRS.

Updates to previously cited U.S. Appl. No. 12/409,763 filed Mar. 24, 2009, First Named Inventor Tzachi Glovinsky, entire current file wrapper available on USPTO PAIRS.

Updates to previously cited U.S. Appl. No. 12/409,604 filed Mar. 24, 2009, First Named Inventor Tzachi Glovinsky, entire current file wrapper available on USPTO PAIRS.

Updates to previously cited U.S. Appl. No. 12/329,525 filed Dec. 5, 2008, First Named Inventor Meir Adest, entire current file wrapper available on USPTO PAIRS.

Updates to previously cited U.S. Appl. No. 12/314,114 filed Dec. 4, 2008, First Named Inventor Meir Gzait, entire current file wrapper available on USPTO PAIRS.

Updates to previously cited U.S. Appl. No. 12/187,335 filed Aug. 6, 2008, First Named Inventor Amir Fishelov, entire current file wrapper available on USPTO PAIRS.

Updates to previously cited U.S. Appl. No. 12/338,610 filed Dec. 18, 2008, First Named Inventor James Allen, entire current file wrapper available on USPTO PAIRS.

International Patent Application No. PCT/US08/60345. International Prelimianry Report on Patentability dated Aug. 30, 2010.

Parallel U.S. Appl. No. 12/995,704; Notice of allowance dated Jul. 19, 2011.

Parallel International Application No. PCT/US09141044; International Preliminary Report on Patentabiity dated Jul. 6, 2011.

* cited by examiner

_US 8,093,756 B2_

AC POWER SYSTEMS FOR RENEWABLE ELECTRICAL ENERGY

This application is the United States National Stage of International Application No. PCT/US2008/060345, filed Apr. 15, 2008, which claims benefit of and priority to prior International Application No. PCT/US2008/057105, filed Mar. 14, 2008, and which claims benefit of and priority to U.S. Provisional Application No. 60/980,157, filed Oct. 15, 2007, U.S. Provisional Application No. 60/982,053, filed Oct. 23, 2007, and U.S. Provisional Application No. 60/986,979, filed Nov. 9, 2007; and International Application No. PCT/US2008/057105, filed Mar. 14, 2008, claims the benefit of and priority to U.S. Provisional Application No. 60/980,157, filed Oct. 15, 2007, U.S. Provisional Application No. 60/982,053, filed Oct. 23, 2007, and U.S. Provisional Application No. 60/986,979, filed Nov. 9, 2007; each hereby incorporated herein by reference.

TECHNICAL FIELD

This invention relates to the technical field of alternative energy, specifically, methods and apparatus for creating electrical power from some type of alternative energy source to make it available for use in a variety of applications. Through perhaps four different aspects, the invention provides techniques and circuitry that can be used to harvest power at high efficiency from an alternative energy source such as a solar panel, or a sea of strings of panels so that this power can be provided for AC use, perhaps for transfer to a power grid or the like. These four aspects can exist perhaps independently and relate to: 1) controlling electrical power creation with an inverter, 2) operating an inverter at its maximal efficiency even when a solar panel's maximum power point would not be at that level, 3) protecting an inverter, and even 4) providing a system that can react and assure operation for differing components and perhaps even within code limitations or the like.

BACKGROUND

Renewable electrical energy that is electrical energy created from alternative sources such as those that are environmentally compatible and perhaps sourced from easily undisruptively available sources such as solar, wind, geothermal or the like is highly desirable. Considering, but not limiting, the example of solar power this is almost obvious. For years, solar power has been touted as one of the most promising for our increasingly industrialized society. Even though the amount of solar power theoretically available far exceeds most, if not all, other energy sources (alternative or not), there remain practical challenges to utilizing this energy. In general, solar power remains subject to a number of limitations that have kept it from fulfilling the promise it holds. In one regard, it has been a challenge to implement in a manner that provides adequate electrical output as compared to its cost. The present invention addresses an important aspect of this in a manner that significantly increases the ability to cost-effectively permit solar power to be electrically harnessed so that an AC output may be a cost-effective source of electrical power whether it be provided for internal use or for public consumption, such as feedback to a grid or the like.

Focusing on solar power as it may be applied in embodiments of the invention, one of the most efficient ways to convert solar power into electrical energy is through the use of solar cells. These devices create a photovoltaic DC current through the photovoltaic effect. Often these solar cells are linked together electrically to make a combination of cells into a solar panel or a PV (photovoltaic) panel. PV panels are often connected in series to provide high voltage at a reasonable current. Voltage, current, and power levels may be provided at an individual domestic level, such as for an individual house or the like. Similarly, large arrays of many, many panels may be combined in a sea of panels to create significant, perhaps megawatt outputs to public benefit perhaps as an alternative to creating a new coal burning power plant, a new nuclear power plant, or the like.

Regardless of the nature of the combination, the output (perhaps of a solar cell or a solar panel, or even combinations thereof) is then converted to make the electrical power most usable since the power converters often employed can use high voltage input more effectively. This converted output is then often inverted to provide an AC output as generally exists in more dispersed power systems whether at an individual domestic or even a public level. In a first stage in some systems, namely, conversion of the alternative source's input to a converted DC, conventional power converters sometimes even have at their input handled by an MPPT (maximum power point tracking) circuit to extract the maximum amount of power from one or more or even a string of series connected panels. One problem that arises with this approach, though, is that often the PV panels act as current sources and when combined in a series string, the lowest power panel can limit the current through every other panel. In a second stage in some systems, namely the inversion function to transform the DC into AC, another problem can be that operation of the conversion at maximum power point (MPP) can be somewhat incompatible with or at least suboptimal for an inverter. Prior to the present invention, it was widely seen that it was just an inherent characteristic that needed to be accepted and that the MPP conversion function was so electrically critical that it was generally accepted as a control requirement that made suboptimization at the inverter level merely a necessary attribute that was perhaps inherent in any converted-inverted system. Perhaps surprisingly, prior to this invention, the goal of optimizing both the MPP conversion function while also optimizing the inversion function was just not seen as an achievable or perhaps at least significant goal. The present invention proves that both such goals can not only be achieved, but the result can be an extraordinarily efficient system.

In understanding (and perhaps defending) the perceived paramount nature of an MPP operation, it may be helpful to understand that, in general, solar cells historically have been made from semiconductors such as silicon pn junctions. These junctions or diodes convert sunlight into electrical power. These diodes can have a characteristically low voltage output, often on the order of 0.6 volts. Such cells may behave like current sources in parallel with a forward diode. The output current from such a cell may be a function of many construction factors and, is often directly proportional to the amount of sunlight. The low voltage of such a solar cell can be difficult to convert to power suitable for supplying power to an electric power grid. Often, many diodes are connected in series on a photovoltaic panel. For example, a possible configuration could have 36 diodes or panels connected in series to make 21.6 volts. With the shunt diode and interconnect losses in practice such panels might only generate 15 volts at their maximum power point (MPP). For some larger systems having many such panels, even 15 volts may be too low to deliver over a wire without substantial losses. In addition, typical systems today may combine many panels in series to provide voltages in the 100's of volts in order to minimize the conduction loss between the PV panels and a power converter. Electrically, however, there can be challenges to finding the right input impedance for a converter to extract the maximum power from such a string of PV panels. Naturally, the input usually influences the output. Input variances can be magnified because, the PV panels usually act as current sources and the panel producing the lowest current can sometimes limit the current through the whole string. In some undesirable situations, weak panels can become back biased by the remainder of the panels. Although reverse diodes can be placed across each panel to limit the power loss in this case and to protect the panel from reverse breakdown, there still can be significant variances in the converted output and thus the inverted input. In solar panel systems, problems can arise due to: non-uniformity between panels, partial shade of individual panels, dirt or accumulated matter blocking sunlight on a panel, damage to a panel, and even non-uniform degradation of panels over time to name at least some aspects. These can all be considered as contributing to the perception that a varying inverted input was at least practically inevitable. Just the fact that a series connection is often desired to get high enough voltage to efficiently transmit power through a local distribution to a load, perhaps such as a grid-tied inverter has further compounded the aspect. In real world applications, there is also frequently a desire or need to use unlike types of panels without regard to the connection configuration desired (series or parallel, etc.). All of this can be viewed as contributing to the expectation of inevitability relative to the fact that the inverter input could not be managed for optimum efficiency.

In previous state-of-the-art system, acceptable efficiency has been at relatively lower levels (at least as compared to the present invention). For example, in the article by G. R. Walker, J. Xue and P. Sernia entitled "PV String Per-Module Maximum Power Point Enabling Converters" those authors may have even suggested that efficiency losses were inevitable. Lower levels of efficiency, such as achieved through their 'enhanced' circuitries, were touted as acceptable. Similarly, two of the same authors, G. R. Walker and P. Sernia in the article entitled "Cascaded DC-DC Converter Connection of Photovoltaic Modules" suggested that the needed technologies would always be at an efficiency disadvantage. These references even include an efficiency vs. power graph showing a full power efficiency of approximately 91%. With the high cost of PV panels operation through such a low efficiency converter it is no wonder that solar power has been seen as not yet readily acceptable for the marketplace. The present invention shows that this need not be true, and that much higher levels of efficiency are in fact achievable.

Another less understood problem with large series strings of PV panels may be with highly varying output voltage, the inverter stage driving the grid my need to operate over a very wide range also lowering its efficiency. It may also be a problem if during periods of time when the inverter section is not powering the grid that the input voltage to this stage may increase above regulatory limits. Or conversely, if the voltage during this time is not over a regulatory limit then the final operational voltage may be much lower than the ideal point of efficiency for the inverter. In addition, there may be start-up and protection issues which add significant cost to the overall power conversion process. Other less obvious issues affecting Balance of System (BOS) costs for a solar power installation are also involved. Thus, what at least one aspect of electrical solar power needs is an improvement in efficiency in the conversion stage of the electrical system. The present invention provides this needed improvement.

DISCLOSURE OF THE INVENTION

As mentioned with respect to the field of invention, the invention includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

In various embodiments, the present invention discloses achievements, systems, and different initial exemplary control functionalities through which one may achieve some of the goals of the present invention. Systems provide for inverter controlled systems of photovoltaic conversion, high efficiency renewable energy creation, inverter protection designs, and even dynamically reactive conversion systems.

Some architectures may combine a PV panel with MPP and even a dual mode power conversion circuitry to make what may be referred to as a Power Conditioner (PC) element. Converters may have a topology such as the initial examples shown in FIGS. 10A and 10B; these are discussed in more detail in the priority applications. As discussed below, the Power Conditioners may be combined in series or parallel or any combination of series/parallel strings and even seas of panels that largely or even always produce their full output. Even differing types of panels, differing types of converters, and differing types of inverters may be combined.

In embodiments, this invention may permit in inverter to produce its maximum power thereby harvesting more total energy from the overall system. Interestingly, this may exist even while a converter alters its acceptance of alternative power to maintain an MPP. Embodiments may be configured so that the output may be a higher voltage AC output (for example, 400V or more). Additionally, configurations may allow for an easy to administer inverter protection, perhaps even with or without feedback elements.

MODE(S) FOR CARRYING OUT THE INVENTION

As mentioned above, the invention discloses a variety of aspects that may be considered independently or in combination with others. Initial understanding begins with the fact that one embodiment of a renewable electrical energy AC power system according to the present invention may combine any of the following concepts and circuits including: an inverter controlled system to at least some extent, a maximal efficiency inverter operational capability, a protected inverter alternative AC energy system, a dynamically reactive photovoltaic system, and an engineered code compliant alternative energy system. Aspects may include a very high efficiency photovoltaic converter, a multimodal photovoltaic converter, slaved systems, and even output voltage and/or output current protected system. Each of these should be understood from a general sense as well as through embodiments that display initial applications for implementation. Some initial benefits of each of these aspects are discussed individually and in combination in the following discussion as well as how each represents a class of topologies, rather than just those initially disclosed.

Figure 1:
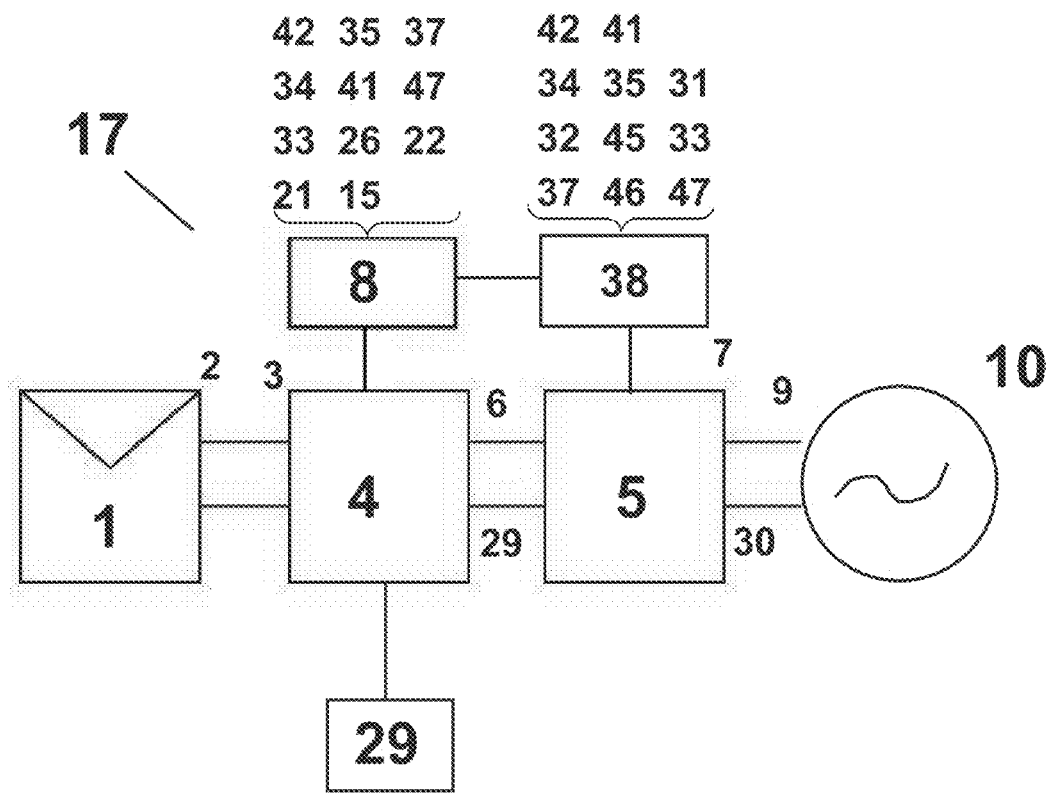
FIG. 1 shows a block diagram of a conversion system according to one embodiment of the invention for a single representative solar source.

FIG. 1 shows one embodiment of a renewable electrical energy power system illustrating the basic conversion and inversion principles of the present invention. As shown, it involves an alternative electrical energy source (1) (here indicated by nomenclature as a solar energy source) feeding into a photovoltaic DC-DC power converter (4) providing a converted output to a DC-AC inverter (5) that may perhaps ultimately interface with a grid (10). As may be appreciated, the alternative electrical energy source (1) may be a solar cell, a solar panel, or perhaps even a string of panels. Regardless, the alternative electrical energy source (1) may create an output such as a DC photovoltaic output (2). This DC photovoltaic output (2) may be established as a DC photovoltaic input (3) to the DC-DC power converter (4). Similarly, the DC-DC power converter (4) may create an output such as a DC photovoltaic output (6). This DC photovoltaic output (6), or more generally photovoltaic DC converter output, may be established as an inverter input (29) to the DC-AC inverter (5). Ultimately, the DC-AC inverter (5) may act to invert the converted DC and create an AC output such as a photovoltaic AC power output (30) which may be established an input to a grid (10), a domestic electrical system, or both, or some other power consuming device or thing.

The DC-DC power converter (4) may have its operation controlled by a capability generally indicated as converter functionality control circuitry (8). As one of ordinary skill in the art should well appreciate, this converter functionality control circuitry (8) may be embodied as true circuitry hardware or it may be firmware or even software to accomplish the desired control and would still fall within the meaning of a converter functionality control circuitry (8). Similarly, the DC-DC power converter (4) should be considered to represent photovoltaic DC-DC power conversion circuitry. In this regard it is likely that hardware circuitry is necessary, however combinations of hardware, firmware, and software should still be understood as encompassed by the circuitry term.

The DC-AC inverter (5) may also have its operation controlled by inverter control circuitry (38) that likewise may be embodied as true circuitry hardware or it may be firmware or even software to accomplish the desired control and would still fall within the meaning of an inverter controlling step or an inverter control circuitry (38).

As illustrated in FIG. 1, the various elements may be connected to each other. Direct connection is but one manner in which the various elements may be responsive to each other, that is, some effect in one may directly or indirectly cause an effect or change in another. For example, while there could be a connection between the inverter control circuitry (38) and the converter functionality control circuitry (8), effects can occur and responsiveness can exist even without the connection. In fact, in a preferred embodiment, no such direct connection is used as the effect can be cause even without such a connection.

Sequencing through the schematic diagram, it can be understood that the DC-DC power converter (4) may act to convert its input and thus provide a converted DC photovoltaic output (6) which may serve as an input to the DC-AC inverter (5) which may be of a variety of designs. This DC-AC inverter (5) may serve as one way to accomplish the step of inverting the DC power into an inverted AC (7) such as a photovoltaic AC power output (7) that can be used by, for example, a power grid (10) through some connection termed an AC power grid interface (9). In this manner the system may create a DC photovoltaic output (6) which may be established as an input to some type of DC-AC inverter (5). This step of inverting an input should be understood as encompassing and creation of any substantially alternating signal from any substantially unidirectional current flow signal even if that signal is not itself perfectly, or even substantially, steady.

Figure 2:
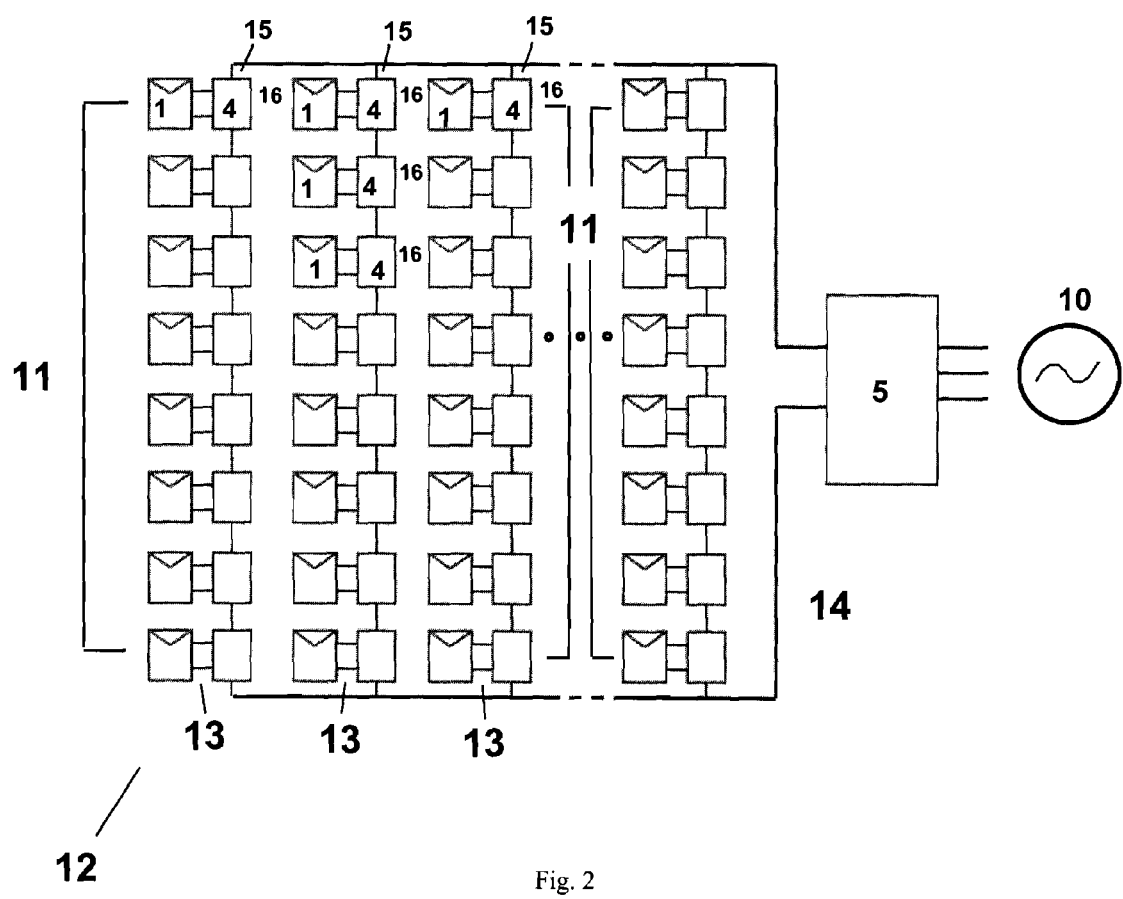
FIG. 2 shows a schematic of a sea of interconnected strings of panels according to one embodiment of the invention.
Figure 5:
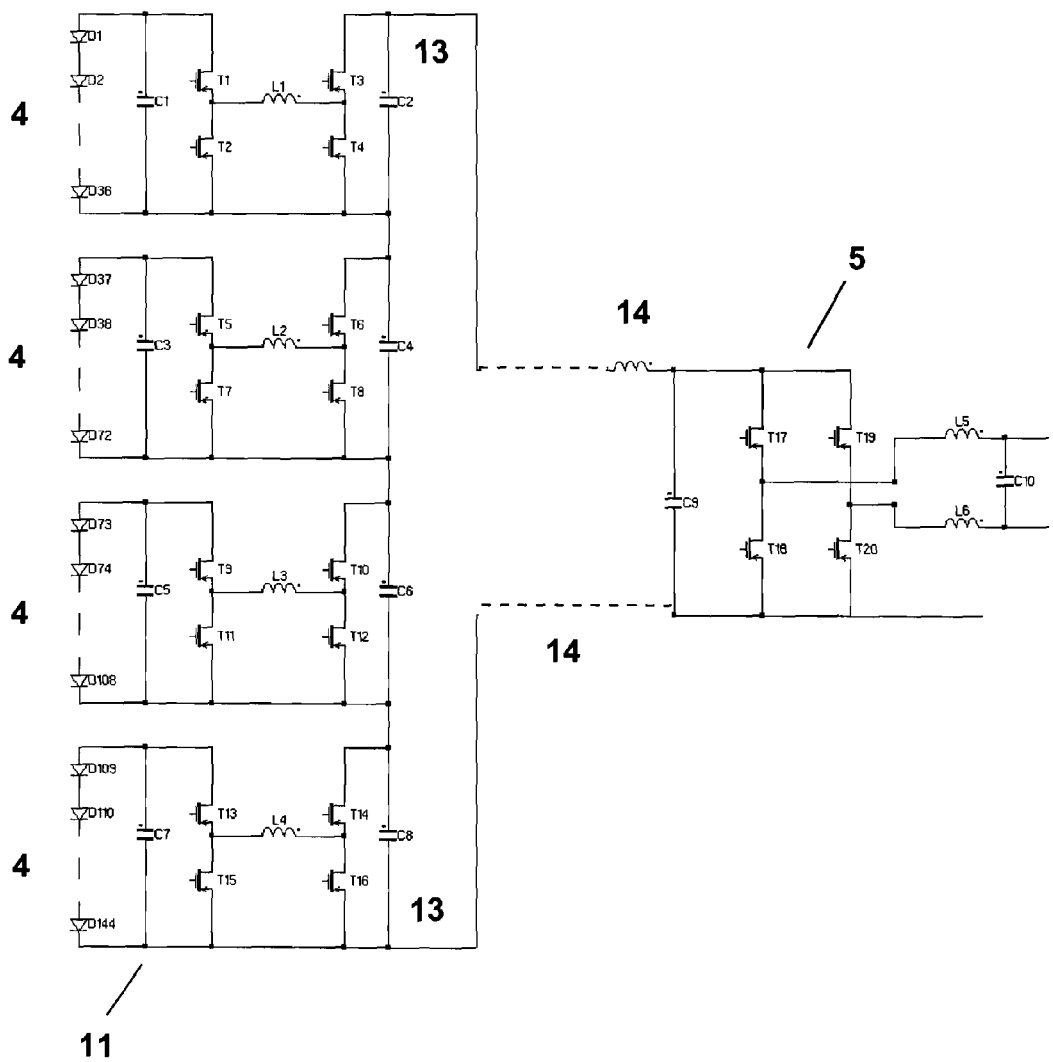
FIG. 5 shows an embodiment of the invention with series connected panels and a single grid-tied inverter configuration.

As shown in FIGS. 2 and 5, individual alternative electrical energy sources (1) (here shown as solar energy sources—whether at a cell, panel, or module level) may be combined to create a series of electrically connected sources. Such combinations may be responsive through either series or parallel connections. As shown in FIGS. 2 and 5, the connected plurality may form a string of electrically connected items, perhaps such as a string of electrically connected solar panels (11). As shown in FIG. 2, each of these strings may themselves be a component to a much larger combination perhaps forming a photovoltaic array (12) or even a sea of combined solar energy sources. By either physical or electrical layout, certain of these cells, panels, or strings may be adjacent in that they may be exposed to somewhat similar electrical, mechanical, environmental, solar exposure (or insolative) conditions. In situations where large arrays or seas are provided, it may be desirable to include a high voltage DC-AC solar power inverter perhaps with a three phase high voltage inverted AC photovoltaic output as schematically illustrated in FIG. 2.

As illustrated for an electrically serial combination, output may be combined so that their voltages may add whereas their currents may be identical. Conversely, electrically parallel combinations may exist. FIGS. 2 and 5 illustrate embodiments that are connected to accomplish serially combining or serially connecting items such as the converted DC photovoltaic outputs (6) to create a converted DC photovoltaic input to a DC-AC inverter (5). As shown, these serial connections may be of the converted DC photovoltaic outputs (6) which may then create a converted DC photovoltaic output (13) which may serve as a converted DC photovoltaic input (14) to some type of photovoltaic DC-AC inverter (5) or other load. Again, each alternative electrical energy source (1) may be a solar source such as at the cell, panel, string, or even array level. As would be well understood, parallel connections and the step of parallel connecting converters or their outputs could be accomplished as well.

As mentioned above, circuitry and systems can be configured to extract as much power as possible from an alternative electrical energy source (1); this is especially applicable for a solar power source or sources where insolation can be variable from source to even adjacent source. Electrically, this may be accomplished by achieving operation to operate at one or more solar cell, panel, or string's maximum power point (MPP) by MPP circuitry or maximum power point tracking (MPPT). Thus, in embodiments, a solar power system according to the invention may include an MPPT control circuit with a power conversion circuit. It may even include range limiting circuitry as discussed later.

Figure 3:
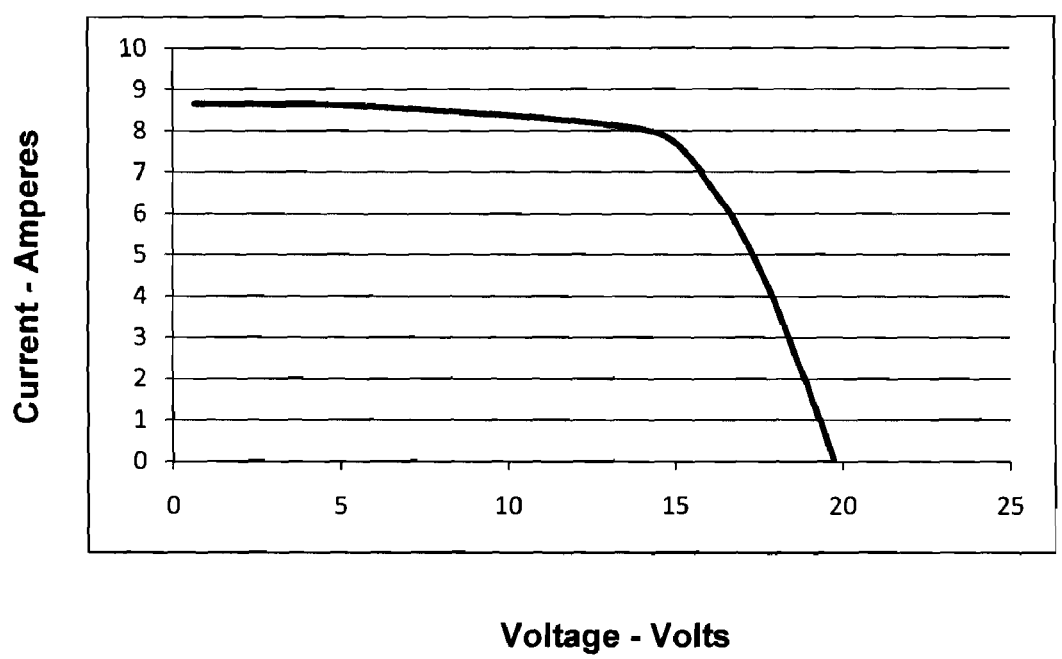
FIG. 3 shows a plot of a current and voltage relationship for a representative solar panel.
Figure 4:
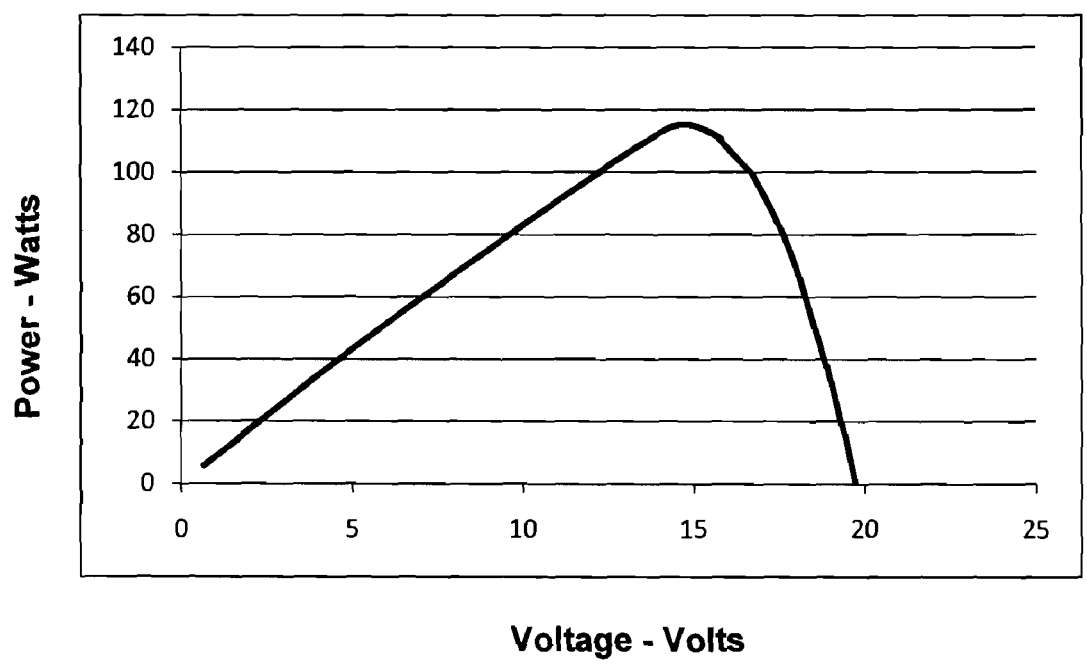
FIG. 4 shows a plot of a power and voltage relationship for a similar panel.

This aspect of maximum power point is illustrated by reference to FIGS. 3 and 4 and the Maximum Power Point Tracking (MPPT) circuit may be configured to find the optimum point for extracting power from a given panel or other alternative electrical energy source (1). As background, it should be understood that a panel such as may be measured in a laboratory may exhibit the voltage and current relationships indicated in FIG. 3. Current in Amps is on the vertical axis. Voltage in volts is on the horizontal axis. If one multiplies the voltage times the current to derive power this is shown in FIG. 4. Power is now on the vertical axis. The goal of an embodiment of an MPPT circuit as used here may be to apply an appropriate condition to a panel such that the panel may operate to provide its peak power. One can see graphically that the maximum power point on this panel under the measurement conditions occurs when the panel produces approximately 15 volts and 8 amperes. This may be determined by a maximum photovoltaic power point converter functionality control circuitry (15) which may even be part or all of the modality of operation of the converter functionality control circuitry (8). In this fashion, the converter or the step of converting may provide a maximum photovoltaic power point modality of photovoltaic DC-DC power conversion or the step of maximum photovoltaic power point converting. This may be accomplished by switching and perhaps also by duty cycle switching at the converter or even inverter level and as such the system may accomplish maximum photovoltaic power point duty cycle switching or the step of maximum photovoltaic voltage determinatively duty cycle switching.

As one skilled in the art would appreciate, there are numerous circuit configurations that may be employed to derive MPP information. Some may be based on observing short circuit current or open circuit voltage. Another class of solutions may be referred to as a Perturb and Observe (P&O) circuit. The P&O methods may be used in conjunction with a technique referred to as a "hill climb" to derive the MPP. As explained below, this MPP can be determined individually for each source, for adjacent sources, of for entire strings to achieve best operation. Thus a combined system embodiment may utilize individually panel (understood to include any source level) dedicated maximum photovoltaic power point converter functionality control circuitries (16).

Regardless of whether individually configured or not, in one P&O method, an analog circuit could be configured to take advantage of existing ripple voltage on the panel. Using simple analog circuitry it may be possible to derive panel voltage and its first derivative (V'), as well as panel power and its first derivative (P'). Using the two derivatives and simple logic it may be possible to adjust the load on the panel as follows:

TABLE 1

| V' Positive | P' Positive | Raise Panel Voltage |
| V' Positive | P' Negative | Lower Panel Voltage |
| V' Negative | P' Positive | Lower Panel Voltage |
| V' Negative | P' Negative | Raise Panel Voltage |

There may be numerous other circuit configurations for finding derivatives and logic for the output, of course. In general, a power conditioner (17) may include power calculation circuitry, firmware, or software (21) which may even be photovoltaic multiplicative resultant circuitry (22). These circuitries may act to effect a result or respond to an item which is analogous to (even if not the precise mathematical resultant of a V*I multiplication function) a power indication. This may of course be a V*I type of calculation of some power parameters and the system may react to either raise or lower itself in some way to ultimately move closer to and eventually achieve operation at an MPP level. By provided a capability and achieving the step of calculating a photovoltaic multiplicative power parameter, the system can respond to that parameter for the desired result.

In many traditional systems, such an MPP operation is often performed at a macro level, that is for entire strings or the entire alternative electrical energy source network. As explained herein, his is one aspect that can contribute to less than optimal efficiency. Often many traditional systems derive MPP at a front end or by some control of the DC-AC inverter (5). Thus, by altering the inverter's power acceptance characteristics, an alteration of the current drawn or other parameter, and thus the total power created, can be altered to pull the maximum from the alternative electrical energy sources (1). Whether at the front of the inverter or not, of course, such an alteration would vary the input to the DC-AC inverter (5) and for this reason as well as the fact that insolation varies, it had come to be expected that inverters would always necessarily experience a variation in input and thus the more important goal of operation at an MPP level would not permit operation at the best efficiency input level for the inverter. The present invention shows that this is not true.

Figure 8:
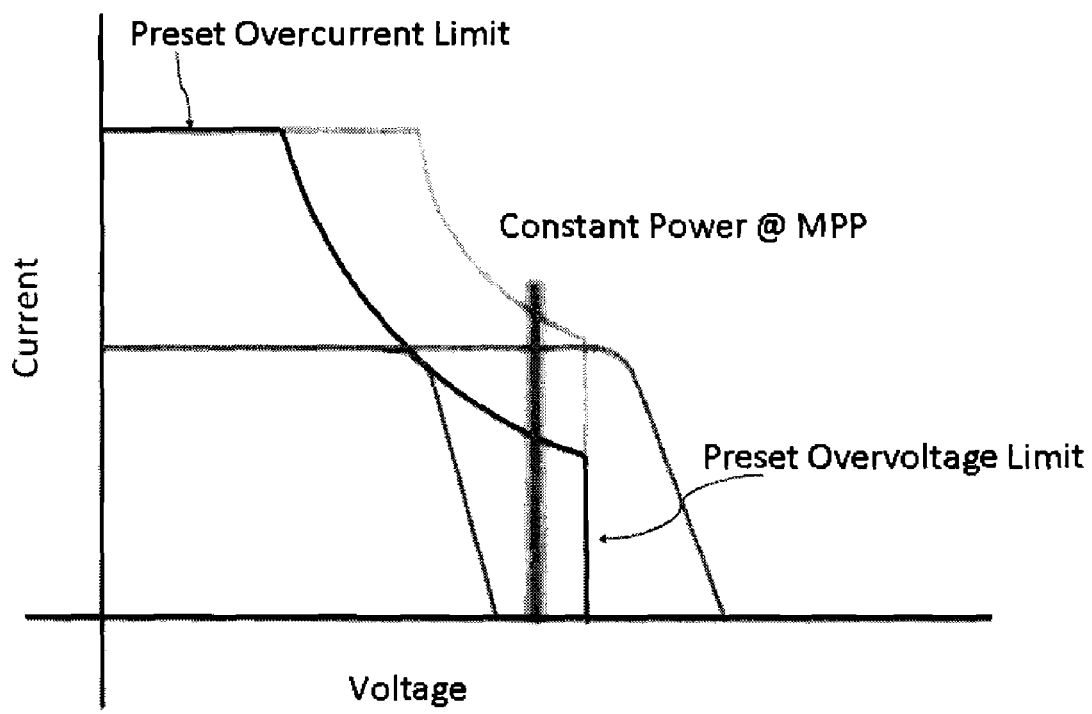
FIG. 8 shows a plot of combined sweet spot, protective, and coordinated process conditions according to one operational embodiment of the invention.
Figure 9:
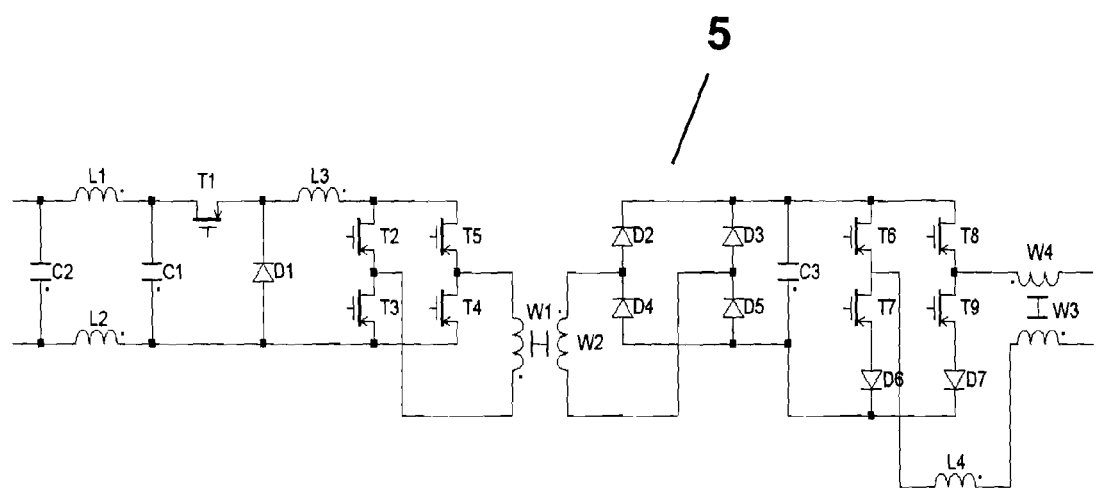
FIG. 9 shows a prior art system with a grid-tied inverter.
Figure 10A:
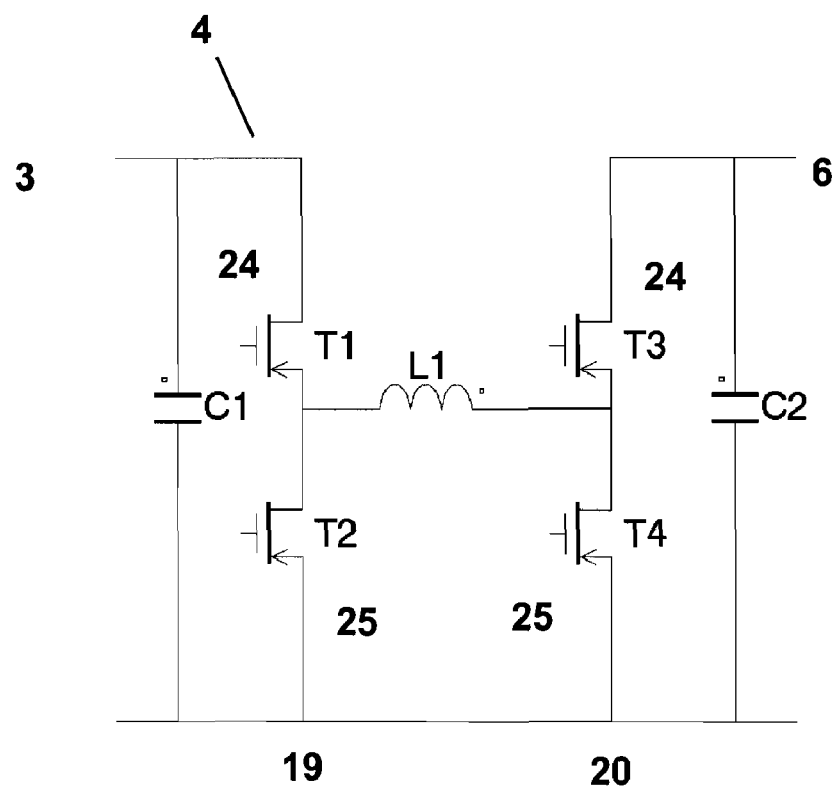
FIGS. 10A and 10B show two types of dual mode power conversion circuits such as might be used in embodiments of the invention.
Figure 10B:
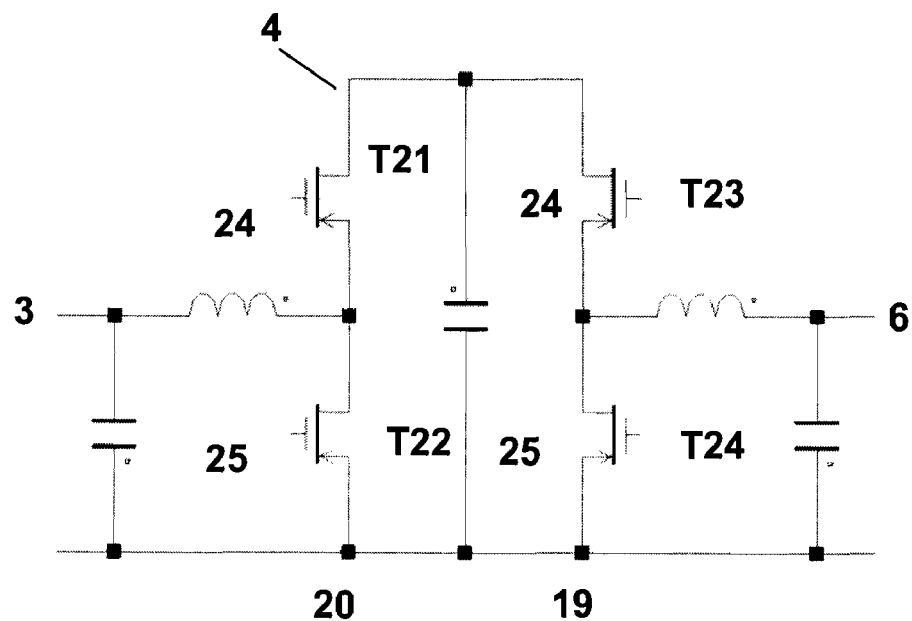

FIG. 9 illustrates one type of photovoltaic DC-AC inverter (5) that may be used. Naturally as may be appreciated from the earlier comments enhanced inverters that need not control MPP may be used. In one aspect of the invention, the inverter may have its input controlled at an optimal level. For example, a separate control input could be used so that the input voltage is at a most optimal level, perhaps such as a singular sweet spot or the like as illustrated by the bold vertical line in FIG. 8. Interestingly and as explained in more detail below, this may be accomplished by the present invention in a manner that is independent of the MPP level at which the converter operates. Finally, as shown, the inverter may be connected to some type of AC power grid interface (9).

Another aspect of the invention is the possibility of the inverter controlling the output of the converter. Traditionally, the inverter has been viewed as a passive recipient of whatever the converter needs to output. In sharp contrast, embodiments of the present invention may involve having the DC-AC inverter (5) control the output of the DC-DC converter (4). As mentioned in more detail below, this may be accomplished by duty cycle switching the DC-AC inverter (5) perhaps through operation of the inverter control circuitry (38). This duty cycle switching can act to cause the output of the DC-DC converter (4) (which itself may have its own operation duty cycle switched to achieve MPP operation) to alter by load or otherwise so that it is at precisely the level the DC-AC inverter (5) wants. As mentioned above, this may be achieved by a direct control input or, for preferred embodiments of the invention may be achieved by simply alter an effect until the converter's DC photovoltaic output (6) and thus the inverter input (29) are as desired. This can be considered as one manner of photovoltaic inverter sourced converting within such a system. With this as but one example of operation, it should be understood that, in general, a control may be considered inverter sourced or derived from conditions or functions or circuitry associated with the DC-AC inverter (5) and thus embodiments of the invention may include inverter sourced photovoltaic power conversion output control circuitry within or associated with the inverter control circuitry (38).

In embodiments, an important aspect of the above control paradigm can be the operation of the inverter to control its own input at an optimal level. For example, it is known that inverter often have a level of voltage input at which the inverter achieves its inverting most efficiently. This is often referred to as the inverter input sweet spot and it is often associated with a specific voltage level for a specific inverter. By providing the action of photovoltaic inverter sourced controlling operation, embodiments may even provide a set point or perhaps substantially constant voltage output as the inverter input (29) and thus embodiments may have a substantially constant power conversion voltage output or may also achieve the step of substantially constant voltage output controlling of the operation of the system. An inverter voltage input set point may be so established, and embodiments may include inverter voltage input set point converter output voltage control circuitry to manage the step of inverter voltage input set point controlling of the operation of the system.

As mentioned above, a surprising aspect of embodiments of the invention may be the fact that inverter input may be maintained independent of and even without regard to a separately maintained MPP level of operation. Thus, inverter optimum input can exist while simultaneously maintaining MPP level of conversion functionality. As but one example, embodiments can include independent inverter operating condition converter output control circuitry or the step of independently controlling an inverter operating condition perhaps through the photovoltaic DC-DC converter or the photovoltaic DC-DC power converter (4). As mentioned above in embodiments, this can be achieved through duty cycle switching of both the photovoltaic DC-DC power converter (4) and the DC-AC inverter (5). In this manner, embodiments may include the step of maximum power point independently controlling the inverter input voltage. For solar panels, systems may have solar panel maximum power point independent inverter input voltage control circuitry (38). This circuitry may be configured for an optimal level and thus embodiment may have solar panel maximum power point independent inverter input optimization photovoltaic power control circuitry. Generally there may be a solar panel maximum power point independent power conversion output or even the step of solar panel maximum power point independently controlling of the operation of the system.

Figure 6A:
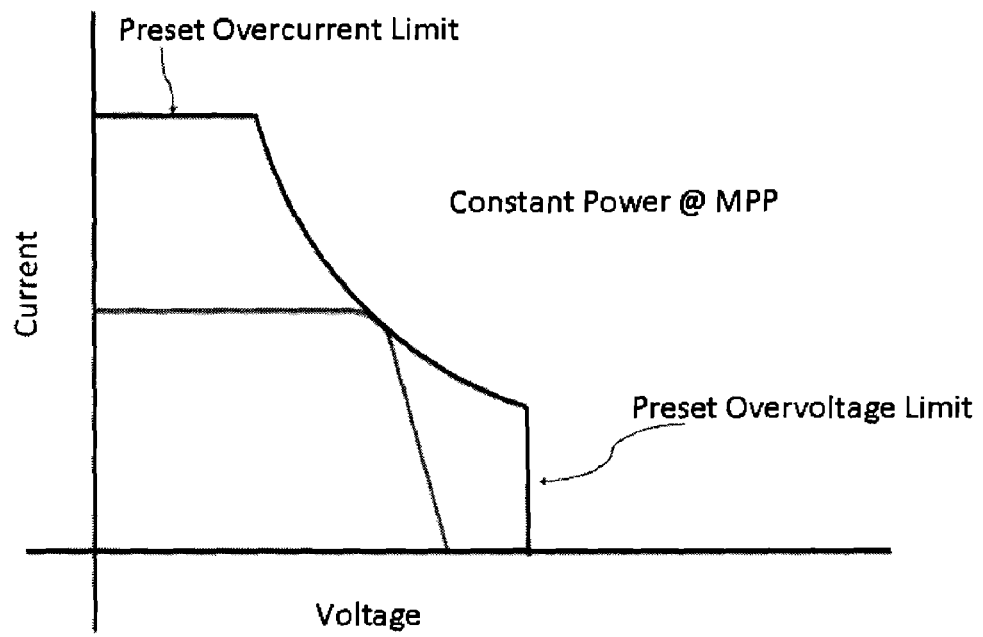
FIGS. 6A and 6B show plots of solar panel output operational conditions for differing temperatures and output paradigms.
Figure 6B:
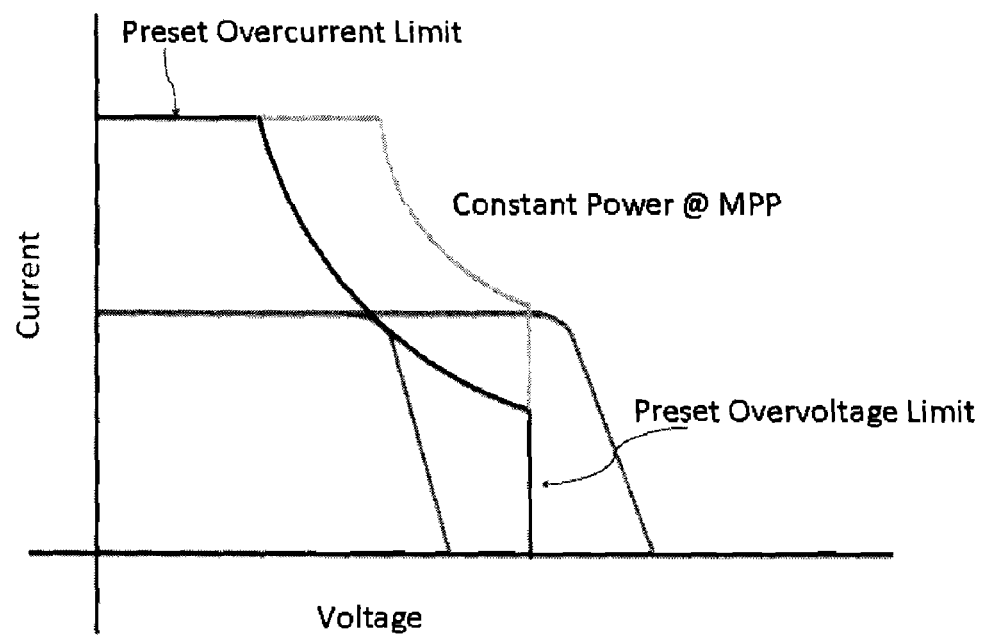
Figure 7:
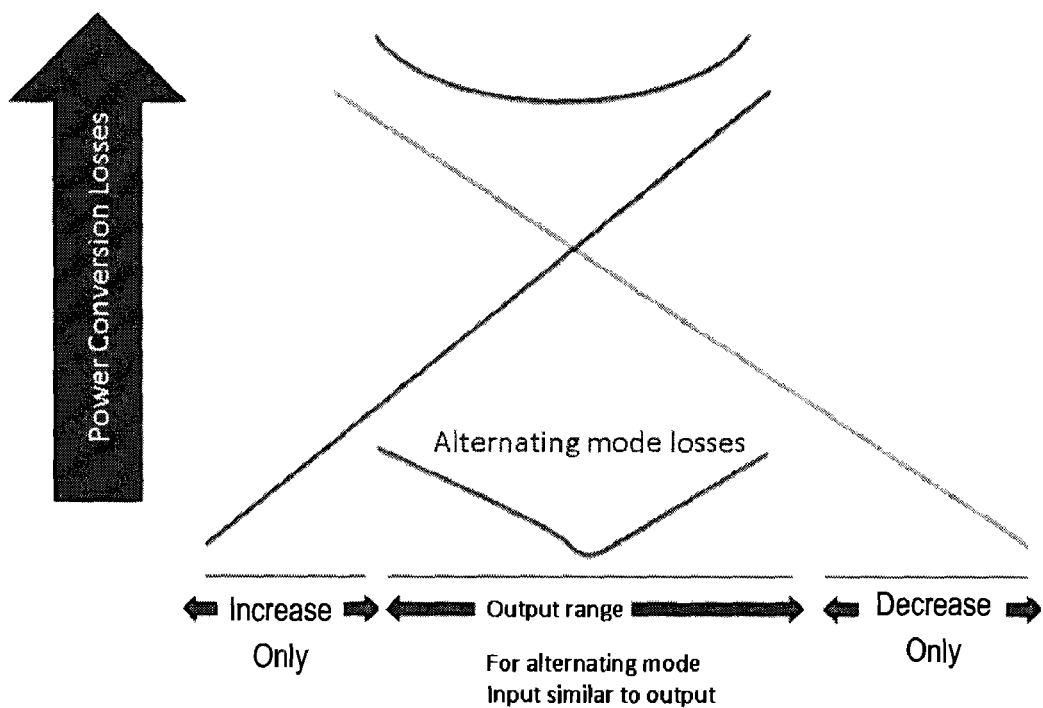
FIG. 7 shows a plot of converter losses by topology and range for a traditional approach considered for a converter element as may be used in embodiments of the present invention.

An aspect of operational capability that afford advantage is the capability of embodiments of the invention to accommodate differing operating conditions for various solar sources or panels. As shown in FIGS. 6A and 6B, voltages of operation for maximum power point can vary based upon not just changes in insolation but also whether the solar source is experiencing hot or cold temperature conditions. By permitting MPP to be accommodated through control apart from any voltage constraint, embodiments according to the invention may provide expansive panel capability. This may even be such that the converter is effectively a full photovoltaic temperature voltage operating range photovoltaic DC-DC power converter whereby it can operate at MPP voltages as high as that for the MPP in a cold temperature of operation as well as the MPP voltages as low as that for the MPP in a hot temperature of operation. Thus, as can be understood from FIGS. 6A and 6B, systems can provide solar energy source open circuit cold voltage determinative switching photovoltaic power conversion control circuitry and solar energy source maximum power point hot voltage determinative switching photovoltaic power conversion control circuitry. It can even achieve full photovoltaic temperature voltage operating range converting. This may be accomplished through proper operation of the switch duty cycles and systems may thus provide solar energy source open circuit cold voltage determinatively duty cycle switching and solar energy source maximum power point hot voltage determinatively duty cycle switching.

Further, viewing hot and cold voltages as perhaps the extreme conditions, similarly it can be understood how the system may accommodate varying amount of insolation and thus there may be provided insolation variable adaptive photovoltaic converter control circuitry that can extract MPP—even while maintaining an optimal inverter input—whether a panel is partially shaded, even if relative to an adjacent panel. Systems and their duty cycle switching may be adaptable to the amount of insolation and so the step of converting may be accomplished as insolation variably adaptively converting. This can be significant in newer technology panels such as cadmium-telluride solar panels and especially when combining outputs from a string of cadmium-telluride solar panels which can have broader operating voltages.

Of significant importance is the level of efficiency with which the entire system operates. This is defined as the power going out over the power coming in. A portion of the efficiency gain is achieved by using switching operation of transistor switches, however, the topology is far more significant in this regard. Specifically, by the operation of switches and the like as discussed above, the system can go far beyond the levels of efficiency previously thought possible. It can even provide a substantially power isomorphic photovoltaic DC-DC power conversion and substantially power isomorphic photovoltaic DC-AC power inversion that does not substantially change the form of power into heat rather than electrical energy by providing as high as about 99.2% efficiency. This can be provided by utilizing substantially power isomorphic photovoltaic converter and inverter functionality and a substantially power isomorphic photovoltaic converter and inverter and by controlling operation of the switches so that there is limited loss as discussed above. Such operation can be at levels of from 97, 97.5, 98, 98.5 up to either 99.2 or essentially the wire transmission loss efficiency (which can be considered the highest possible).

The combined abilities to operate the inverter at its most efficient, sweet spot while simultaneously operating the panels at their MPP aids in these efficiency advantages. While in prior art efficiency was sometimes shown to be less than 91%, this combination can accomplish the needed function while operating even above 98% and at levels as high as only those experiencing wire transmission losses. Efficiencies of about 99.2% can be achieved. When connected to a solar panel or an array of solar panels this efficiency difference can be of paramount importance. Embodiments having a constant voltage input to the inverter can thus be considered as having substantially power isomorphic photovoltaic inverter input control circuitry. When embodiments accomplish this through duty cycle switching for the inverter, such embodiments can be considered as having substantially power isomorphic photovoltaic inverter duty cycle control circuitry or as providing the step of substantially power isomorphically duty cycle switching the photovoltaic DC-AC inverter. The ability to set a constant input regardless of MPP needs allows the inverter controller to optimize the input for the inverter and so serve as inverter efficiency optimized converter control circuitry or provide the step of inverter efficiency optimization controlling of the operation of the system. Of course in embodiments where optimization is determined by operating at the point of maximum efficiency, or the sweet spot, the system can be understood as including inverter sweet spot control circuitry or even as inverter sweet spot converter control circuitry (46) when this is accomplished through the converter's output. Generally, it can also be considered as providing the step of inverter sweet spot controlling of the operation of the system. The inverter sweet spot operation capability can also be slaved to other functions (as discussed later) and thus the inverter sweet spot control circuitry can be slaved inverter sweet spot control circuitry or as providing the step of slavedly controlling sweet spot operation of the photovoltaic DC-AC inverter.

Considering the converter (as discussed in more detail in the priority applications), one aspect that contributes to such efficiency is the fact that minimal change of stored energy during the conversion process. As shown in FIG. 6, such embodiments may include a parallel capacitance and a series inductance. These may be used to store energy at least some times in the operation of converting. It may even be considered that full energy conversion is not accomplished, only the amount of conversion necessary to achieve the desired result.

Also contributing to the overall system efficiency advantage in some embodiments can be the use of electrically connecting panels in a series string so the current through each power conditioner (PC) (17) output may be the same but the output voltage of each PC may be proportional to the amount of power its panel makes together with an MPP per panel capability. Consider the following examples to further disclose the functioning of such series connected embodiments. Examine the circuit of FIG. 5 and compare it to panels simply connected in series (keep in mind that the simple series connection may have a reverse diode across it). First, assume there are four panels in series each producing 100 volts and 1 amp feeding an inverter with its input set to 400 volts. This gives 400 watts output using either approach. Now consider the result of one panel making 100 volts and 0.8 amps (simulating partial shading—less light simply means less current). For the series connection the 0.8 amps flows through each panel making the total power 400×0.8=320 watts. Now consider the circuit of FIG. 5. First, the total power would be 380 watts as each panel is making its own MPP. And of course, as a person of ordinary skill in the art well understands, the current from each Power Conditioner (as this circuit configuration constrained output parameter) must be the same as they are after all still connected in series. But with known power from each PC the voltage may be calculated as:

the three full power voltages plus the 0.8 power voltages sum to 400 volts.

Thus, it can be seen that in this embodiment, three of the panels may have 105.3 volts and one may have 84.2 volts.

Further, in FIG. 5 it can be understood that in some embodiments, an additional benefit may be derived from the inclusion of individual MPP per panel power control. In such embodiments, a power block may be considered as a group of PV panels with power conversion and MPP per panel configurations. As such they may adapt their output as needed to always maintain maximum power from each and every power block.

The advantage of this type of a configuration is illustrated from a second example of MPP operation. This example is one to illustrate where one panel is shaded such that it can now only produce 0.5 amps. For the series connected string, with as a person of ordinary skill in the art well understands, current as the circuit configuration constrained output parameter and voltage as the circuit configuration unconstrained output parameter (opposite for a parallel configuration), the three panels producing 1 amp may completely reverse bias the panel making 0.5 amps causing the reverse diode to conduct. There may even be only power coming from three of the panels and this may total 300 watts. Again for an embodiment circuit of invention, each PC may be producing MPP totaling 350 watts. The voltage calculation would this time be:

the three full power voltages plus the 0.5 power voltage sum to 400 volts.

This, in this instance, the three panels may have a voltage of 114.2 volts and the remaining one may have half as much, or 57.1 volts. These are basic examples to illustrate some advantages. In an actual PV string today there may be many PV panels in series. And usually none of them make exactly the same power. Thus, many panels may become back biased and most may even produce less than their individual MPP. As discussed below, such configurations can also be configured to include voltage limits and/or protection perhaps by setting operational boundaries. Importantly, however, output voltage can be seen as proportional to PV panel output power thus yielding a better result to be available to the DC-AC inverter (5) for use in its inversion. Now, when the DC-AC inverter (5) is also able to be operated at its sweet spot, as would occur when independently controlling the circuit configuration unconstrained output parameter independent of MPP, it can efficiently invert the individualized MPP energy pulled from the sea of panels or the like for the overall system efficiency gains mentioned.

An interesting, and perhaps even surprising aspect of the invention is that the DC-AC inverter (5) can be coordinated with the photovoltaic DC-DC converter (4). Embodiments can have inverter coordinated photovoltaic power conversion control circuitry (45) or can provide the step of inverter coordinated converting or inverter coordinated controlling of the operations. As mentioned this can be direct or indirect. As shown in FIG. 1, there could be a direct connection from the inverter control circuitry (38) to the converter functionality control circuitry (8), however, in preferred embodiments, no such direct connection may be needed. Specifically, and for only one example, by simply controlling its duty cycle to maintain a sweet spot input, the DC-AC inverter (5) can cause the photovoltaic DC-DC converter (4) to alter its operation as it simply tries to maintain its duty cycle to maintain MPP. This indirect control is still considered as providing photovoltaic converter output control circuitry, and even more specifically, as providing photovoltaic converter output voltage control circuitry (32) because it causes the step of controlling a photovoltaic DC-DC converter output (also referred to as the DC photovoltaic output (2)) of the photovoltaic DC-DC converter (4), and even more specifically, as providing the step of controlling a photovoltaic DC-DC converter voltage output of the photovoltaic DC-DC converter (4).

While in theory or in normal operation the described circuits work fine, there can be additional requirements for a system to have practical function. For example the dual mode circuit (described in more detail in the priority applications) could go to infinite output voltage if there were no load present. This situation can actually occur frequently. Consider the situation in the morning when the sun first strikes a PV panel string with power conditioners (17). There may be no grid connection at this point and the inverter section may not draw any power. In this case the power conditioner (17) might in practical terms increase its output voltage until the inverter would break. The inverter could have overvoltage protection on its input adding additional power conversion components or, the power conditioner may simply have its own internal output voltage limit. For example if each power conditioner (17) could only produce 100 volts maximum and there was a string of ten PCs in series the maximum output voltage would be 1000 volts. This output voltage limit could make the grid-tied inverter less complex or costly and is illustrated in FIG. 6A as a preset overvoltage limit. Thus embodiments can present maximum voltage determinative switching photovoltaic power conversion control circuitry and maximum photovoltaic voltage determinative duty cycle switching (as shown in FIG. 6A as the preset overvoltage limit). This can be inverter specific and so an additional aspect of embodiments of the invention can be the inclusion of inverter protection schemes. The operation over the potentially vast ranges of temperatures, insolations, and even panel conditions or characteristics can cause such significant variations in voltage and current because when trying to maintain one parameter (such as sweet spot voltage or the like), some of these variations can cause another parameter (such as output current or the like) to exceed an inverter, building code, or otherwise acceptable level. Embodiments of the present invention can account for these aspects as well and may even provide this through the DC-DC power converter (4) and/or the DC-AC inverter (5) thus including inverter protection photovoltaic power conversion control circuitry (33) at either or both levels. Considering output, input, voltage and current limitations as initial examples, it can be understood that embodiments can provide the steps of providing photovoltaic inverter protection power conversion control and even controlling a limited photovoltaic converter current output through operation of the photovoltaic DC-DC converter (4). These may be configured with consideration of maximum inverter inputs and converter outputs so there can be included maximum inverter input converter output control circuitry (37), maximum inverter voltage determinative switching photovoltaic power conversion control circuitry, or also the step of controlling a maximum inverter input converter output. As alluded to above, each of these more generic types of capabilities and elements as well as others can be provided in a slaved manner so that either they themselves are subservient to or dominant over another function and thus embodiments can provide slaved photovoltaic power control circuitry (34). As sometimes indicated in FIG. 1, such slaved photovoltaic power control circuitry (34) (as well as various other functions as a person of ordinary skill would readily understand) can be provided at either the photovoltaic DC-DC power converter (4), the DC-AC inverter (5), or both, or elsewhere. These can include converter current output limited photovoltaic power control circuitry, converter voltage output limited photovoltaic power control circuitry, or the like. Thus, embodiments can have slaved photovoltaic inverter protection control circuitry, or more specifically, slaved photovoltaic current level control circuitry or slaved photovoltaic voltage level control circuitry, or may provide the steps of slavedly providing photovoltaic inverter protection control of the photovoltaic DC-AC inverter (5), slavedly controlling current from the photovoltaic DC-DC converter (4), or the like. Considering such voltage and current limits, it can be understood that system may more generally be considered as including photovoltaic boundary condition power conversion control circuitry and as providing the step of photovoltaic boundary condition power conversion control. Thus, as illustrated in FIGS. 6A, 6B, and 8, boundary conditions may be set such as the overcurrent limit and the overvoltage limit. And the DC-AC inverter (5), the photovoltaic DC-DC converter (4), and/or either or both of their control circuitries may serve as photovoltaic boundary condition converter functionality control circuitry, may achieve a photovoltaic boundary condition modality of photovoltaic DC-DC power conversion, and may accomplish the step of controlling a photovoltaic boundary condition of the photovoltaic DC-DC converter.

In the above example of a maximum output current limit, it should be understood that this may also be useful as illustrated in FIG. 6A as a preset overcurrent limit. This is less straightforward and is related to the nature of a PV panel. If a PV panel is subjected to insufficient light its output voltage may drop but its output current may not be capable of increasing. There can be an advantage to only allowing a small margin of additional current. For example, this same 100 watt panel which has a 100 volt maximum voltage limit could also have a 2 amp current limit without limiting its intended use. This may also greatly simplify the following grid tied inverter stage. Consider an inverter in a large installation which may need a crowbar shunt front end for protection. Such could be provided in addition to duty cycle control or the like. If the output of a PC could go to 100 amps the crowbar would have to handle impractical currents. This situation would not exist in a non PC environment as a simple PV panel string could be easily collapsed with a crowbar circuit. This current limit circuit may only be needed with a PC and it may be easily achieved by duty cycle or more precisely switch operation control. Once a current limit is included another BOS savings may be realized. Now the wire size for interconnect of the series string of PCs may be limited to only carry that maximum current limit. Here embodiments can present maximum photovoltaic inverter current converter functionality control circuitry, inverter maximum current determinative switching, photovoltaic inverter maximum current determinative duty cycle switch control circuitry, and photovoltaic inverter maximum current determinatively duty cycle switching or the like.

One more system problem may also be addressed. In solar installations it may occur on rare conditions that a panel or field of panels may be subjected to more than full sun. This may happen when a refractory situation exists with clouds or other reflective surfaces. It may be that a PV source may generate as much as 1.5 times the rated power for a few minutes. The grid tied inverter section must either be able to operate at this higher power (adding cost) or must somehow avoid this power. A power limit in the PC may be the most effective way to solve this problem. In general, protection of the DC-AC inverter (5) can be achieved by the photovoltaic DC-DC converter (4) as an inverter protection modality of the photovoltaic DC-DC power conversion or as inverter protection converter functionality control circuitry. In maintaining inverter sweet spot input, such circuitry can also provide desirable inverter operating conditions, thus embodiments may include photovoltaic inverter operating condition converter functionality control circuitry. There may also be embodiments that have small output voltage (even within an allowed output voltage range). This may accommodate an inverter with a small energy storage capacitor. The output voltage may even be coordinated with an inverter's energy storage capability.

As mentioned above, certain aspect may be slaved to (subservient) or may slave other aspects (dominant). One possible goal in switching for some embodiments may include the maximum power point operation and sweet spot operational characteristics discussed above as well as a number of modalities as discussed below. Some of these modalities may even be slaved such that one takes precedence of one or another at some point in time, in some power regime, or perhaps based on some power parameter to achieve a variety of modalities of operation. There may be photovoltaic duty cycle switching, and such may be controlled by photovoltaic duty cycle switch control circuitry (again understood as encompassing hardware, firmware, software, and even combinations of each). With respect to the DC-AC inverter (5), there may be more generally the slaved photovoltaic power control circuitry (34) mentioned above, slaved inverter operating condition control circuitry, slaved photovoltaic voltage level control circuitry and even the steps of slavedly controlling voltage from the photovoltaic DC-DC converter (4) or slavedly controlling operation of the photovoltaic DC-DC converter (4).

Another aspect of some embodiments of the invention can be protection or operation of components or the DC-AC inverter (5) so as to address abrupt changes in condition. This can be accomplished through the inclusion of soft transition photovoltaic power conversion control circuitry (35) or the step of softly transitioning a photovoltaic electrical parameter or more specifically even softly transitioning a converted photovoltaic power level electrical parameter. Thus, another mode of operation may be to make a value proportional (in its broadest sense) to some other aspect. For example, there can be advantages to making voltage proportional to current such as to provide soft start capability or the like. Thus embodiments may be configured for controlling a maximum photovoltaic output voltage proportional to a photovoltaic output current at least some times during the process of converting a DC input to a DC output. In general, this may provide soft transition photovoltaic power conversion control circuitry (35). Focusing on voltage and current as only two such parameters, embodiments can include ramped photovoltaic current power conversion control circuitry, ramped photovoltaic voltage power conversion control circuitry, or the steps of ramping (which be linear or may have any other shape) a photovoltaic current level, ramping a photovoltaic voltage level, or the like. One of the many ways in which such soft transition can be accomplished can be by making one parameter proportional to another. For example, embodiments can include photovoltaic output voltage-photovoltaic output current proportional control circuitry (39) or can provide the step of controlling a photovoltaic output voltage proportional to a photovoltaic output current.

Further, embodiments of the system may include duty cycle control or switch operation that can be conducted so as to achieve one or more proportionalities between parameters perhaps such as the initial examples of maximum voltage output and current output or the like. Further, not only can any of the above by combined with any other of the above, but each may be provided in a slaved manner such that consideration of one modality is secondary to or dominant over that of another modality.

As mentioned above one technique of some control activities can be through the use of duty cycle switching or the like. Switches on either or both of the photovoltaic DC-DC power converter (4) or the DC-AC inverter (5) can be controlled in a variable duty cycle mode of operation such that frequency of switching alters to achieve the desired facet. The converter functionality control circuitry (8), perhaps providing the step of maximum photovoltaic power point duty cycle switching of a photovoltaic DC-DC converter, or the inverter control circuitry (38) may serve as photovoltaic duty cycle switch control circuitry. The duty cycle operations and switching can achieve a variety of results, from serving as photovoltaic transformation duty cycle switching, to photovoltaic impedance transformation duty cycle switching, to photovoltaic input control duty cycle switching, to photovoltaic output duty cycle switching, to photovoltaic voltage duty cycle switching, to photovoltaic current duty cycle switching, to soft transition duty cycle switching, to photovoltaic optimization duty cycle switching, to other operations. The photovoltaic inverter duty cycle switch control circuitry (31) may even act to provide the step of maximum photovoltaic voltage determinatively duty cycle switching the DC-AC inverter (5).

A variety of results have been described above. These may be achieved by simply altering the duty cycle of or switches affected by the switches. These can be accomplished based on thresholds and so provide threshold triggered alternative mode, threshold determinative, threshold activation, or threshold deactivation switching photovoltaic power conversion control circuitry. A burst mode of operation perhaps such as when nearing a mode alteration level of operation may be provided and at such times frequency can be halved, opposing modes can be both alternated, and level can be reduced as a change become incipient. This can be transient as well. In these manners burst mode switching photovoltaic power conversion control circuitry and burst mode switching can be accomplished, as well as transient opposition mode photovoltaic duty cycle switch control circuitry and even the step of transiently establishing opposing switching modes.

As discussed in more detail in the priority applications, there may be a variety of modes of operation of a photovoltaic DC-DC power converter (4). These may include modes of increasing and, perhaps alternatively, decreasing photovoltaic load impedance, the output, or otherwise. Systems according to embodiments of the invention may combine inverter aspects with a photovoltaic DC-DC power converter (4) that serves as a multimodal photovoltaic DC-DC power converter perhaps controlled by multimodal converter functionality control circuitry (26) in that it has more than one mode of operation. These modes may include, but should be understood as not limited to, photovoltaic output increasing and photovoltaic output decreasing, among others. In general, the aspect of multimodal activity encompasses at least processes where only one mode of conversion occurs at any one time.

Thus, a power conditioner (17) may provide at least first modality and second modality photovoltaic DC-DC power conversion circuitry, DC-DC power converter, or DC-DC power conversion in conjunction with the inverter capabilities discussed herein. By offering the capability of more than one mode of operation (even though not necessarily utilized at the same time), or in offering the capability of changing modes of operation, the system may accomplish the step of multimodally operating. Similarly, by offering the capability of controlling to effect more than one mode of conversion operation (again, even though not necessarily utilized at the same time), or in controlling to change modes of operation, the system may accomplish the step of multimodally controlling operation of a photovoltaic DC-DC power converter (4) or a DC-AC inverter (5).

Embodiments may include a photovoltaic DC-DC power converter (4) that has even two or more modes of operation and thus may be considered a dual mode power conversion circuit or dual mode converter. The dual mode nature of this circuit may embody a significant benefit and another distinction may be that most DC/DC converters are often intended to take an unregulated source and produce a regulated output. In this invention, the input to the DC/DC converter is regulated either up or down—and in a highly efficient manner—to be at the PV panel MPP. The dual mode nature of the converter may also serve to facilitate an effect caused by the inverter's operation even without a direct connection. Of course, such modes of operation can be adapted for application with respect to the inverter's duty cycle switching as well.

As mentioned above, the PCs and photovoltaic DC-DC power converters (4) may handle individual panels. They may be attached to a panel, to a frame, or separate. Embodiments may have converters physically integral to such panels in the sense that they are provided as one attached unit for ultimate installation. This can be desirable such as when there are independent operating conditions for separate solar sources, and even adjacent solar sources to accommodate variations in insolation, condition, or otherwise. Each panel or the like may achieve its own MPP, and may coordinate protection with all others in a string or the like.

As may be understood, systems can include an aspect of reacting to operational conditions to which elements are subjected. This can occur in a dynamic fashion so that as one condition changes, nearly instantly a reaction to control appropriately is caused. They can also react to installation conditions and can react to the particular elements. This can make installation easier. For example, if connected to differing types of solar panels, differing age or condition elements, differing types of converters, or even differing types of inverters, some embodiments of the invention can automatically act to accommodate the element, to stay within code, or to otherwise act so that regardless of the overall system or the overall dissimilarity, an optimal result can be achieved. Again this dynamically reactive control feature can be configured at either or both the photovoltaic DC-DC power converter (4) or the DC-AC inverter (5). At either location, embodiments can provide dynamically reactive internal output limited photovoltaic power control circuitry (42) it can also provide the step of dynamically reactively controlling an internal output or even dynamically reactively converting. Both of these features, or even any other dynamically reactive capability, can be slaved either dominantly or subserviently. Thus, embodiments of the invention can provide slaved dynamically reactive photovoltaic power control circuitry or the step of slavedly dynamically reactively controlling an aspect of the system. This could include slavedly dynamically reactively controlling an internal output through operation of the photovoltaic DC-DC converter (4).

The aspect of addressing an external as well as an internal output can be helpful to meeting code or other requirements when there is no way to know what type of panel or other component the system is hooked to. In situations where an internal signal (perhaps such as the signal transmitting power from a rooftop collection of panels to a basement inverter grid connection) is not permitted to exceed a specified level of voltage, current, or otherwise needs to meet limitations on existing wiring or circuit breakers or the like, embodiments can provide the dynamically reactive control as code compliant dynamically reactive photovoltaic power control circuitry (41). It may also provide the step of code compliantly dynamically reactively controlling an internal output. This can occur through operation of the photovoltaic DC-DC converter (4), the DC-AC inverter (5), or otherwise. Of course this code complaint feature can be slaved to take dominance over other features such as MPP activity, sweet spot activity, boundary condition activity, or the like. In this manner embodiments can provide slaved code compliant dynamically reactive photovoltaic power control circuitry or can provide the step of slavedly code compliantly dynamically reactively controlling internal output, perhaps through operation of the photovoltaic DC-DC converter (4) or otherwise. Beyond code compliance, it can be readily understood how the general feature of a dynamically reactive control can act to permit connection to existing or dissimilar sources as well. Thus whether by programming, circuitry, or other configuration, embodiments can provide dynamically multisource reactive photovoltaic power control circuitry (43) or may provide the step of multisource dynamically reactively controlling internal output, perhaps through operation of the photovoltaic DC-DC converter (4). Of course this can all be accomplished while maintaining the inverter input at an optimum level in appropriate circumstances and thus embodiments can include reactive inverter input optimization photovoltaic power control circuitry.

As the invention becomes more accepted it may be advantageous to permit comparison with more traditional technologies or operating conditions. This can be achieved by simple switch operation whereby traditional modes of operation can be duplicated or perhaps adequately mimicked to permit a comparison. Thus, for a solar focus, embodiments may include a solar power conversion comparator (44) that can compare first and second modes of operation, perhaps the improved mode of an embodiment of the present invention and a traditional, less efficient mode. This comparator may involve indicating some solar energy parameter for each. In this regard, the shunt switch operation disable element may be helpful. From this a variety of difference can be indicated, perhaps: solar power output, solar power efficiency differences, solar power cost differences, solar power insolation utilization comparisons, and the like. Whether through software or hardware or otherwise, embodiments can include an ability to function with a first power capability and a second power capability. These may be traditional and improved capabilities, perhaps such as a traditional power conversion capability and an improved power conversion capability or a traditional power inversion capability and an improved power inversion capability. The inverter control circuitry (38) or the converter functionality control circuitry (8) or otherwise can be configured to achieve either or both of these first and second capabilities. As one example, the inverter can act to achieve an input voltage that would have been seen without the features of the present invention and thus embodiments can provide an off-maximum efficiency inverter input voltage control (47) or may act to provide the step of controlling inverter input voltage off a maximum efficiency level. In instances where the improved embodiment achieves inverter sweet spot operation capability, embodiments may act to compare the steps of traditionally power inverting a DC photovoltaic input and sweet spot input inverting a DC photovoltaic input. Any of these can provide a user any type of output to inform the user for comparison with other systems.

By the above combinations of these concepts and circuitry, at least some of the following benefits may be realized:

Every PV panel may produce its individual maximum power. Many estimates today indicate this may increase the power generated in a PV installation by 20% or even more.

The grid tied inverter may be greatly simplified and operate more efficiently.

The Balance of System costs for a PV installation may be reduced.

The circuitry, concepts and methods of various embodiments of the invention may be broadly applied. It may be that one or more PCs per panel may be used. For example there may be non-uniformities on a single panel or other reasons for harvesting power from even portions of a panel. It may be for example that small power converters may be used on panel segments optimizing the power which may be extracted from a panel. This invention is explicitly stated to include sub panel applications.

This invention may be optimally applied to strings of panels. It may be more economical for example to simply use a PC for each string of panels in a larger installation. This could be particularly beneficial in parallel connected strings if one string was not able to produce much power into the voltage the remainder of the strings is producing. In this case one PC per string may increase the power harvested from a large installation.

This invention is assumed to include many physical installation options. For example there may be a hard physical connection between the PC and a panel. There may be an interconnection box for strings in which a PC per string may be installed. A given panel may have one or more PCs incorporated into the panel. A PC may also be a stand-alone physical entity.

All of the foregoing is discussed at times in the context of a solar power application. As may be appreciated, some if not all aspects may be applied in other contexts as well. Thus, this disclosure should be understood as supporting other applications regardless how applied.

As can be easily understood from the foregoing, the basic concepts of the present invention may be embodied in a variety of ways. It involves both solar power generation techniques as well as devices to accomplish the appropriate power generation. In this application, the power generation techniques are disclosed as part of the results shown to be achieved by the various circuits and devices described and as steps which are inherent to utilization. They are simply the natural result of utilizing the devices and circuits as intended and described. In addition, while some circuits are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the devices and circuits described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "converter" should be understood to encompass disclosure of the act of "converting"—whether explicitly discussed or not—and, conversely, were there effectively disclosure of the act of "converting", such a disclosure should be understood to encompass disclosure of a "converter" and even a "means for converting" Such changes and alternative terms are to be understood to be explicitly included in the description.

Any patents, publications, or other references mentioned in this application for patent or its list of references are hereby incorporated by reference. Any priority case(s) claimed at any time by this or any subsequent application are hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the List of References or other information statement filed with or included in the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) each of the power source devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, xii) each potentially dependent claim or concept as a dependency on each and every one of the independent claims or concepts presented, and xiii) all inventions described herein. In addition and as to computerized aspects and each aspect amenable to programming or other programmable electronic automation, the applicant(s) should be understood to have support to claim and make a statement of invention to at least: xiv) processes performed with the aid of or on a computer as described throughout the above discussion, xv) a programmable apparatus as described throughout the above discussion, xvi) a computer readable memory encoded with data to direct a computer comprising means or elements which function as described throughout the above discussion, xvii) a computer configured as herein disclosed and described, xviii) individual or combined subroutines and programs as herein disclosed and described, xix) the related methods disclosed and described, xx) similar, equivalent, and even implicit variations of each of these systems and methods, xxi) those alternative designs which accomplish each of the functions shown as are disclosed and described, xxii) those alternative designs and methods which accomplish each of the functions shown as are implicit to accomplish that which is disclosed and described, xxiii) each feature, component, and step shown as separate and independent inventions, and xxiv) the various combinations and permutations of each of the above.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. Both the examiner and any person otherwise interested in existing or later potential coverage, or considering if there has at any time been any possibility of an indication of disclaimer or surrender of potential coverage, should be aware that in the absence of explicit statements, no such surrender or disclaimer is intended or should be considered as existing in this or any subsequent application.

In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A method of dynamically reactive renewable electrical energy power creation comprising the steps of:
   creating a plurality of DC photovoltaic outputs from multiple alternative electrical energy sources;
   establishing said DC photovoltaic outputs as DC photovoltaic inputs to a plurality of photovoltaic DC-DC power converters;
   dynamically reactively converting each of said DC photovoltaic inputs to create a plurality of converted DC photovoltaic outputs for combination so as to have both a circuit configuration constrained output parameter and a circuit configuration unconstrained output parameter such combination creating a combined converted DC photovoltaic output;
   dynamically reactively controlling each of said circuit configuration unconstrained output parameters through operation of each of said photovoltaic DC-DC converters while also maximum power point independently controlling operation of each of said photovoltaic DC-DC converters, each while each of said photovoltaic DC-DC converters act to convert said DC photovoltaic input into said converted DC photovoltaic output;
   establishing said combined converted DC photovoltaic output to support a converted DC photovoltaic input to a photovoltaic DC-AC inverter; and
   inverting said converted DC photovoltaic input into a photovoltaic AC power output.

2. A method of dynamically reactive renewable electrical energy power creation as described in claim 1 wherein said step of dynamically reactively controlling each said circuit configuration unconstrained output parameter through operation of a photovoltaic DC-DC converter comprises the step of multisource dynamically reactively controlling said circuit configuration unconstrained output parameter through operation of said photovoltaic DC-DC converter.

3. A method of dynamically reactive renewable electrical energy power creation as described in claim 2 wherein said step of multisource dynamically reactively controlling said circuit configuration unconstrained output parameter through operation of said photovoltaic DC-DC converter comprises the step of controlling a series connected photovoltaic converter voltage output through operation of said photovoltaic DC-DC converter.

4. A method of dynamically reactive renewable electrical energy power creation as described in claim 2 wherein said step of multisource dynamically reactively controlling said circuit configuration unconstrained output parameter through operation of said photovoltaic DC-DC converter comprises the step of controlling a parallel connected photovoltaic converter current output through operation of said photovoltaic DC-DC converter.

5. A method of dynamically reactive renewable electrical energy power creation as described in claim 1 wherein said step of dynamically reactively controlling each said circuit configuration unconstrained output parameter through operation of said photovoltaic DC-DC converter comprises the step of code compliantly dynamically reactively controlling said circuit configuration unconstrained output parameter through operation of said photovoltaic DC-DC converter.

6. A method of dynamically reactive renewable electrical energy power creation as described in claim 5 wherein said step of code compliantly dynamically reactively controlling said circuit configuration unconstrained output parameter through operation of said photovoltaic DC-DC converter comprises the step of slavedly dynamically reactively controlling said circuit configuration unconstrained output parameter through operation of said photovoltaic DC-DC converter.

7. A method of dynamically reactive renewable electrical energy power creation as described in claim 6 wherein said step of slavedly dynamically reactively controlling said circuit configuration unconstrained output parameter through operation of said photovoltaic DC-DC converter comprises the step of slavedly code compliantly dynamically reactively controlling said circuit configuration unconstrained output parameter through operation of said photovoltaic DC-DC converter.

8. A method of dynamically reactive renewable electrical energy power creation as described in claim 1 wherein said step of creating a plurality of DC photovoltaic outputs from multiple alternative electrical energy source comprises the step of creating outputs from a plurality of electrically connected solar panels.

9. A method of dynamically reactive renewable electrical energy power creation as described in claim 8 wherein said step of dynamically reactively converting each said DC photovoltaic input further comprises the step of individual dedicated panel converting a DC photovoltaic input from each of said plurality of solar panels.

10. A method of dynamically reactive renewable electrical energy power creation as described in claim 9 wherein said step of maximum power point independently controlling operation of each said photovoltaic DC-DC converter comprises the step of individual dedicated maximum photovoltaic power point converting a DC photovoltaic input from each of said plurality of solar panels.

11. A method of dynamically reactive renewable electrical energy power creation as described in claim 10 wherein said step of dynamically reactively converting each said DC photovoltaic input comprises the step of physically integrally converting said DC photovoltaic input for individual solar panels.

12. A method of dynamically reactive renewable electrical energy power creation as described in claim 8 and further comprising the step of serially connecting a plurality of photovoltaic DC-DC power converters to serially connect outputs having voltage as said circuit configuration unconstrained output parameter.

13. A method of dynamically reactive renewable electrical energy power creation as described in claim 8 and further comprising the step of parallel connecting a plurality of photovoltaic DC-DC power converters to parallel connect outputs having current as said circuit configuration unconstrained output parameter.

14. A method of dynamically reactive renewable electrical energy power creation as described in claim 1 wherein said step of creating a plurality of DC photovoltaic outputs from multiple alternative electrical energy sources comprises the step of creating a DC photovoltaic output from each of a plurality of solar panels arranged in a photovoltaic array; and wherein said step of dynamically reactively controlling said circuit configuration unconstrained output parameter through operation of said photovoltaic DC-DC converter comprises the step of dynamically reactively individual panel controlling said circuit configuration unconstrained output parameter through operation of said photovoltaic DC-DC converter.

15. A method of dynamically reactive renewable electrical energy power creation as described in claim 14 wherein said step of dynamically reactively individual panel controlling said circuit configuration unconstrained output parameter through operation of said photovoltaic DC-DC converter comprises the step of code compliantly dynamically reactively individual panel controlling said circuit configuration unconstrained output parameter through operation of said photovoltaic DC-DC converter.

16. A method of dynamically reactive renewable electrical energy power creation as described in claim 1 and further comprising the step of switching solar power conversion between a first power capability and a second power capability.

17. A method of dynamically reactive renewable electrical energy power creation as described in claim 16 wherein said step of switching solar power conversion between a first power capability and a second power capability comprises the step of switching between the steps of traditionally power converting said DC photovoltaic input and improved power converting said DC photovoltaic input.

18. A method of dynamically reactive renewable electrical energy power creation as described in claim 1 and further comprising a step of duty cycle switching said DC-AC inverter selected from a group consisting of:
　　maximum photovoltaic voltage determinatively duty cycle switching a photovoltaic DC-AC inverter; and
　　photovoltaic inverter maximum current determinatively duty cycle switching a photovoltaic DC-AC inverter.

19. A method of dynamically reactive renewable electrical energy power creation as described in claim 1 and further comprising the step of maximum photovoltaic power point duty cycle switching a photovoltaic DC-DC converter.

20. A method of dynamically reactive renewable electrical energy power creation as described in claim 1 and further comprising the step of photovoltaic inverter maximum current determinatively duty cycle switching a photovoltaic DC-DC converter.

\* \* \* \* \*